(12) United States Patent
Kumagai et al.

(10) Patent No.: US 12,176,011 B1
(45) Date of Patent: Dec. 24, 2024

(54) DATA STORAGE DEVICE WITH ACCELERATED POST-EMERGENCY-POWER-OFF RECOVERY PROCESS

(71) Applicant: WESTERN DIGITAL TECHNOLOGIES, INC., San Jose, CA (US)

(72) Inventors: Satoshi Kumagai, Machida (JP); Takahiro Oue, Kamakura (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/231,891

(22) Filed: Aug. 9, 2023

Related U.S. Application Data

(60) Provisional application No. 63/522,939, filed on Jun. 23, 2023.

(51) Int. Cl.
| | | |
|---|---|---|
| *G11B 5/09* | (2006.01) | |
| *G11B 5/596* | (2006.01) | |
| *G11B 19/04* | (2006.01) | |

(52) U.S. Cl.
CPC ............ *G11B 5/09* (2013.01); *G11B 5/59655* (2013.01); *G11B 19/047* (2013.01)

(58) Field of Classification Search
None
See application file for complete search history.

(56) References Cited

U.S. PATENT DOCUMENTS

| | | | |
|---|---|---|---|
| 5,182,679 A * | 1/1993 | Nishimura | ............ G11B 27/28 |
| 6,192,450 B1 | 2/2001 | Bauman et al. | |
| 7,249,106 B1 * | 7/2007 | Tanabe | ............ G11B 20/00666 726/32 |
| 8,499,184 B2 | 7/2013 | Hutchison et al. | |
| 9,047,932 B1 * | 6/2015 | Nicholls | ............ G11B 19/047 |
| 9,070,417 B1 * | 6/2015 | Nagashima | ...... G11B 20/10527 |
| 9,436,596 B2 | 9/2016 | Sengupta et al. | |

(Continued)

OTHER PUBLICATIONS

Lee, S. et al., X-SSD_A Storage System with Native Support for Database Logging and Replication https://dl.acm.org/doi/pdf/10.1145/3514221.3526188; SIGMOD '22, Jun. 12-17, 2022, Philadelphia, PA, USA, 15 pages.

*Primary Examiner* — Peter Vincent Agustin
(74) *Attorney, Agent, or Firm* — Calderon Safran & Wright P.C.

(57) ABSTRACT

Illustrative aspects are directed to a data storage device, comprising disks, an actuator mechanism configured to position heads proximate to the disks, and processing devices, including a memory. The processing devices are configured to: receive data with an indicated address for writing the data to a selected disk; read, from the selected disk, a data sector from a location that comprises the indicated address; integrate the received data with a subset of the sector read from the selected disk, thereby generating a new sector that comprises the received data positioned in the new sector in accordance with the indicated address; detect, while the new sector is in the memory and not yet written to the selected disk, a loss of nominal electrical power to the data storage device; and write, in response to detecting the loss of nominal electrical power, the new sector from the memory to a non-volatile cache.

20 Claims, 14 Drawing Sheets

(56) References Cited

U.S. PATENT DOCUMENTS

| | | | |
|---|---|---|---|
| 2002/0116614 A1* | 8/2002 | Shibasaki | G06F 21/10 |
| | | | 713/168 |
| 2003/0112729 A1* | 6/2003 | Nichols | G11B 27/11 |
| | | | 369/53.22 |
| 2004/0042112 A1* | 3/2004 | Stence | G06F 3/0676 |
| | | | 386/E5.042 |
| 2006/0080501 A1 | 4/2006 | Auerbach et al. | |
| 2008/0114930 A1 | 5/2008 | Sanvido et al. | |
| 2009/0303630 A1* | 12/2009 | Zhou | G11B 19/047 |
| 2012/0047328 A1* | 2/2012 | Williams | G11B 5/09 |
| | | | 711/E12.017 |
| 2013/0198752 A1 | 8/2013 | Benhase et al. | |
| 2022/0276962 A1 | 9/2022 | Segev et al. | |

* cited by examiner

DATA STORAGE DEVICE WITH ACCELERATED POST-EMERGENCY-POWER-OFF RECOVERY PROCESS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry that performs novel and inventive emergency power-off (EPO) recovery-optimized processes and optimized post-EPO recovery processes, in accordance with aspects of the present disclosure. Inventive EPO recovery-optimized circuitry of this disclosure enables substantially faster lossless recovery to nominal data storage and operation of the disk drive after an emergency loss of power, among other inventive advantages.

Aspects of this disclosure include novel and inventive insights relative to conventional disk drives, including as follows. When a disk drive receives new data from a host (e.g., computer or data center) for storage, the disk drive may typically first receive the data in random access memory (RAM) and then write the data to disk, which is a longer process than receiving the data in RAM. Because RAM is volatile, prior to the invention of emergency power-off (EPO) processes, in the event of an emergency loss of power while data that the host had sent to the disk drive which the disk drive had loaded in RAM but had not yet written to disk, the data was lost. In disk drives enabled with a typical EPO process, the disk drive has a short amount of time and internal power to quickly transfer any recently received data from RAM to non-volatile cache (NVC), which can be done with less time and power than writing to disk. Among the inventive insights of this disclosure, in modern conventional disk drives, the amount of data accumulated in RAM and not yet written to disk at any point in time can be considerable, with a large number of separate sets of recently received data, in an illustrative example. Because time and resources after an emergency loss of power are substantially constrained, a conventional disk drive EPO process is tightly focused on saving the at-risk data from RAM to NVC. Once power is restored to nominal, the conventional disk drive performs a post-EPO recovery process. With many separate sets of data, the post-EPO recovery process may require a substantial amount of time to recover and write all of those separate sets of data from NVC to disk.

The host may include a specified logic block address (LBA) for a given set of data to write to disk, where the LBA specifies the location on one of the disk surfaces where the set of data is to be written. The LBA may be for a disk location that is not aligned with media block address (MBA) boundaries between data sectors. For such unaligned sets of data, the disk drive must first read the pre-existing data sector that includes the LBA, and integrate the new set of data with the subset of data from the sector comprising the unaligned head and/or tail data from the data sector outside of the track portion indicated by the LBA and the size of the set of data, for the data to be ready to write within a package of a complete and integrated data sector. This may be referred to as a received, read, and integrated (RRI) data sector.

In the design of conventional disk drives, it has been an assumption that in the emergency conditions of the EPO process, the control circuitry should write the data that is held only in RAM and is not yet stored on the disk surfaces, to an NVC. However, among the inventive insights of this disclosure are that performance advantages can be gained by writing additional data from RAM to NVC, beyond just the data that only exists in RAM, but also to include the entirety of any complete RRI data sectors that control circuitry has generated in RAM but has not yet written to disk surfaces at the time of emergency power loss, even though this involves saving some data from RAM to NVC that is already safely stored on disk.

These inventive insights run contrary to the conventional assumption that, in an emergency power loss, with very little time and very little internal emergency power, and where prior to the invention of EPO process technology, there would have been a catastrophic complete loss of recently received data from RAM, the disk drive should focus on saving the data that only exists in RAM to an electronic NVC, and not spend some of the short remaining reserve of time and power writing sets of data from RAM to NVC that are already safely stored on disk when the emergency loss of power strikes. However, among the inventive insights of this disclosure, a disk drive of this disclosure may be configured with ample emergency internal power to enable EPO recovery-optimized circuitry to perform a recovery-optimized EPO process for all applicable data from RAM, including complete RRI sectors, within the emergency reserves of time and power available. In its recovery-optimized emergency response process, in response to detecting the emergency loss of power, EPO recovery-optimized circuitry of this disclosure identifies all (or at least one or more) complete and/or partial RRI sectors that are in RAM and not yet written to disk surfaces, and writes all of those complete and/or partial RRI sectors to NVC, rather than only the new data. EPO recovery-optimized circuitry of this disclosure may do this even though the RRI sectors include substantial portions of data that are also already written to the disk surfaces.

In this manner, EPO recovery-optimized circuitry of this disclosure not only saves, for permanent storage, all of the data that only exists in RAM at the point of emergency loss of power, but also substantially optimizes and speeds up the later recovery process, once nominal power is restored to disk drive. EPO recovery-optimized circuitry of this disclosure thereby implements accelerated and optimized post-emergency recovery and destaging of recovered data to home locations on disk, substantially more rapidly than is possible in conventional disk drives, to having all data received by the disk drive prior to emergency power loss being nominally long-term stored on disk surfaces post-recovery, among other advantages of this disclosure.

Various illustrative aspects are directed to a data storage device, comprising one or more disks; an actuator mechanism configured to position heads proximate to disk surfaces among the one or more disks; and one or more processing devices. The one or more processing devices comprise a memory component. The one or more processing devices are configured to receive a set of data with an indicated address for writing the set of data to a selected disk surface among the disk surfaces. The one or more processing devices are further configured to read, from the selected disk surface, a data sector from a data sector location that comprises the indicated address. The one or more processing devices are further configured to integrate, in the memory component, the received set of data with a subset of the data sector read from the selected disk surface, thereby generating a new data sector that comprises the received set of data positioned in the new data sector in accordance with the indicated address. The one or more processing devices are further configured to detect, while the new data sector is in the memory component and not yet written to the selected disk surface, a loss of nominal electrical power to the data storage device. The one or more processing devices are further configured to write, in response to detecting the loss of nominal electrical power, the new data sector from the memory component to a non-volatile cache.

Various illustrative aspects are directed to a method comprising receiving, by one or more processing devices, a set of data with an indicated address for writing the set of data to a selected disk surface among one or more disks. The method further comprises reading, by the one or more processing devices from the selected disk surface, a data sector from a data sector location that comprises the indicated address; integrating, by the one or more processing devices in a memory component, the received set of data with a subset of the data sector read from the selected disk surface, thereby generating a new data sector that comprises the received set of data positioned in the new data sector in accordance with the indicated address. The method further comprises detecting, by the one or more processing devices, while the new data sector is in the memory component and not yet written to the selected disk surface, a loss of nominal electrical power to the data storage device. The method further comprises writing, by the one or more processing devices, in response to detecting the loss of nominal electrical power, the new data sector from the memory component to a non-volatile cache.

Various illustrative aspects are directed to one or more processing devices comprising means for receiving a set of data with an indicated address for writing the set of data to a selected disk surface among one or more disks. The one or more processing devices further comprise means for reading, from the selected disk surface, a data sector from a data sector location that comprises the indicated address; means for integrating, in a memory component, the received set of data with a subset of the data sector read from the selected disk surface, thereby generating a new data sector that comprises the received set of data positioned in the new data sector in accordance with the indicated address. The one or more processing devices further comprise means for detecting, while the new data sector is in the memory component and not yet written to the selected disk surface, a loss of nominal electrical power to the data storage device. The one or more processing devices further comprise means for writing, in response to detecting the loss of nominal electrical power, the new data sector from the memory component to a non-volatile cache.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
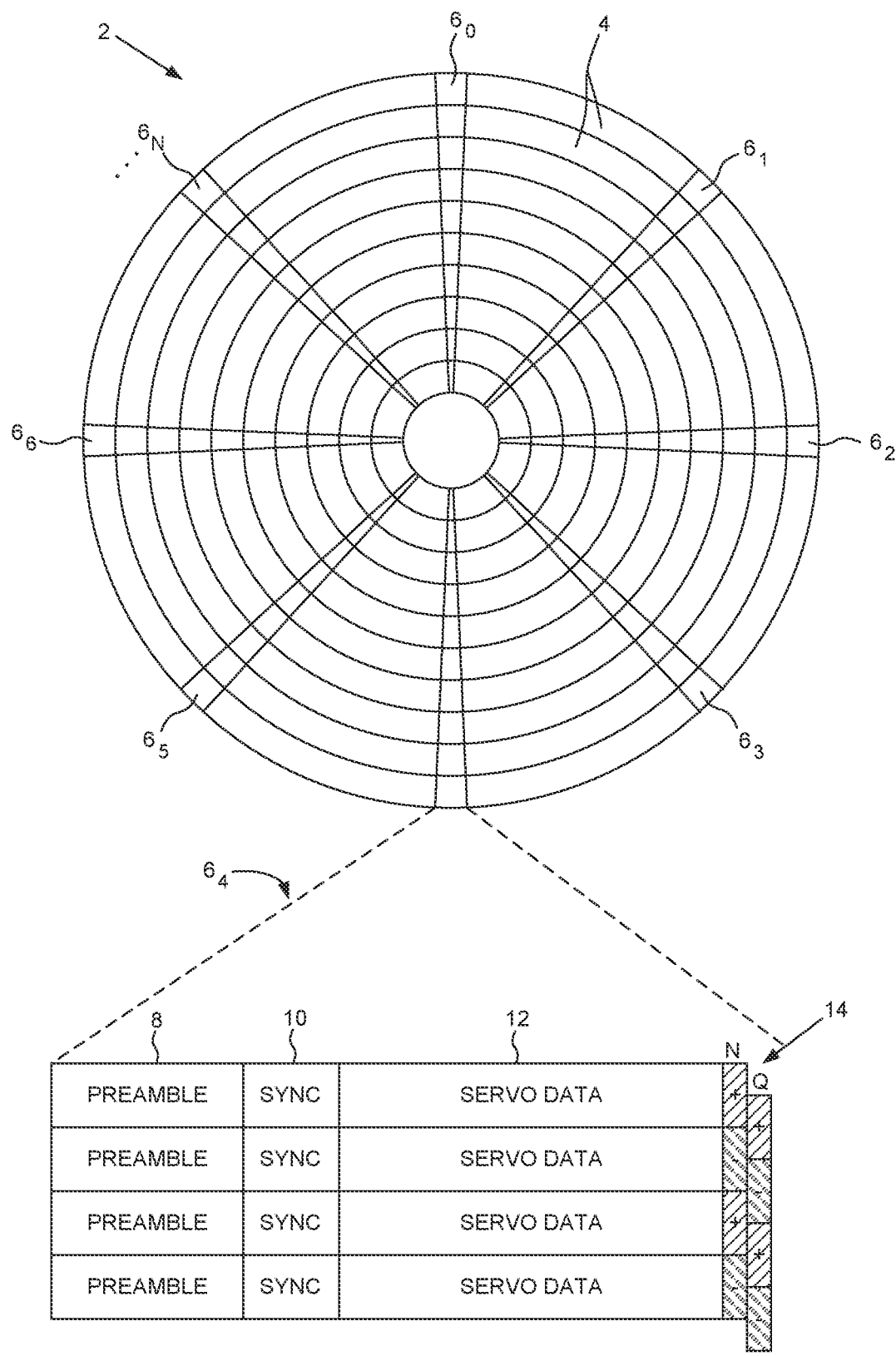
FIG. 1 shows a prior art disk format as comprising a number of radially-spaced, concentric servo tracks defined by servo wedges recorded around the circumference of each servo track.
Figure 2:
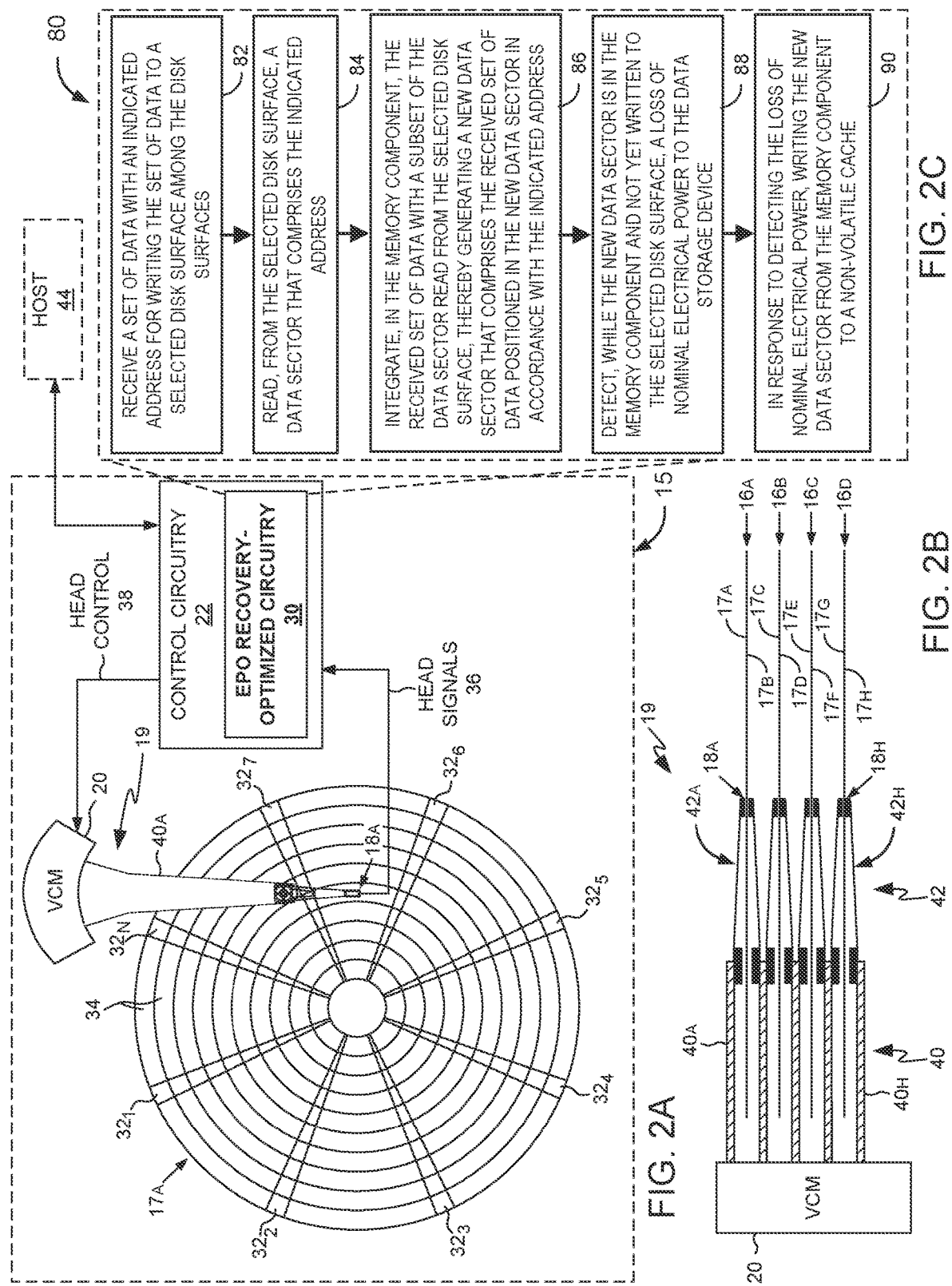
FIGS. 2A and 2B illustrate conceptual block diagrams of a top view and a side view of a data storage device in the form of a disk drive, in accordance with aspects of the present disclosure.
FIG. 2C depicts a flowchart for an example method that read/write channel circuitry of control circuitry of a disk drive may perform or execute in controlling the operations of the disk drive, including for accelerated and optimized EPO and post-EPO recovery processes, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises EPO recovery-optimized circuitry 30. FIG. 2C depicts a flowchart for an example method 80 that EPO recovery-optimized circuitry 30 of control circuitry 22 may perform or execute in controlling the operations of disk drive 15, in accordance with aspects of the present disclosure, including operations involved in performing recovery-optimized EPO processes and accelerated and optimized post-EPO processes, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in a local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges 32₁-32N, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges 32₁-32N and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), EPO recovery-optimized circuitry 30 of control circuitry 22 may issue one or more commands to other components of disk drive 15, receive information from one or more other components of disk drive 15, and/or perform one or more internal operations, such as generating one or more control signals for outputting to system components of disk drive 15. In particular, EPO recovery-optimized circuitry 30 of control circuitry 22 may receive a set of data with an indicated address for writing the set of data to a selected disk surface among the disk surfaces (82). EPO recovery-optimized circuitry 30 may further read, from the selected disk surface, a data sector from a data sector location that comprises the indicated address (84). EPO recovery-optimized circuitry 30 may further integrate, in the memory component, the received set of data with a subset of the data sector read from the selected disk surface, thereby generating a new data sector that comprises the received set of data positioned in the new data sector in accordance with the indicated address (86). EPO recovery-optimized circuitry 30 may further detect, while the new data sector is in the memory component and not yet written to the selected disk surface, a loss of nominal electrical power to the data storage device (88). EPO recovery-optimized circuitry 30 may further write, in response to detecting the loss of nominal electrical power, the new data sector from the memory component to a non-volatile cache (90). Control circuitry 22, including EPO recovery-optimized circuitry 30, may further perform additional actions, methods, and techniques, in accordance with various aspects including as further described herein.

The term "EPO recovery-optimized circuitry 30" as used herein may refer to any hardware, firmware, software, and/or combination thereof, comprised in control circuitry 22 of disk drive 15, which implements, embodies, or engages in any of the structures or functions ascribed herein to EPO recovery-optimized circuitry 30 or to any other of the novel and inventive aspects of the present disclosure. EPO recovery-optimized circuitry 30 may constitute any hardware, firmware, software, and/or any other elements of control circuitry 22 for recovery-optimized EPO processes and optimized post-EPO processes, and performing other techniques and methods as described herein.

In various examples, the new data sector may be considered "in the memory component" when the new data sector is loaded in the memory component. In various examples, the new data sector may be considered "in the memory component" at times when EPO recovery-optimized circuitry 30 has either finished or has begun integrating the physical or magnetic correlates of the newly received data, or any portion thereof, together with head and/or tail data or any data read from the address-indicated data sector from the disk surface, into any physically ordered structure, arrangement, or set, within the memory component, of the physical correlates of data of the new data sector and of the physical correlates of data of the data sector read from the disk surface. The new data sector, including any portion thereof, may be in the memory component in any integrated format preparatory or suitably arranged for later transferring or writing the data from the separate sources in an integrated transfer or write of the data to any recipient component external to the memory component, such as a disk surface main data storage area, a media cache, an NVC, or other target memory component or cache component or data storage component.

Figure 3:
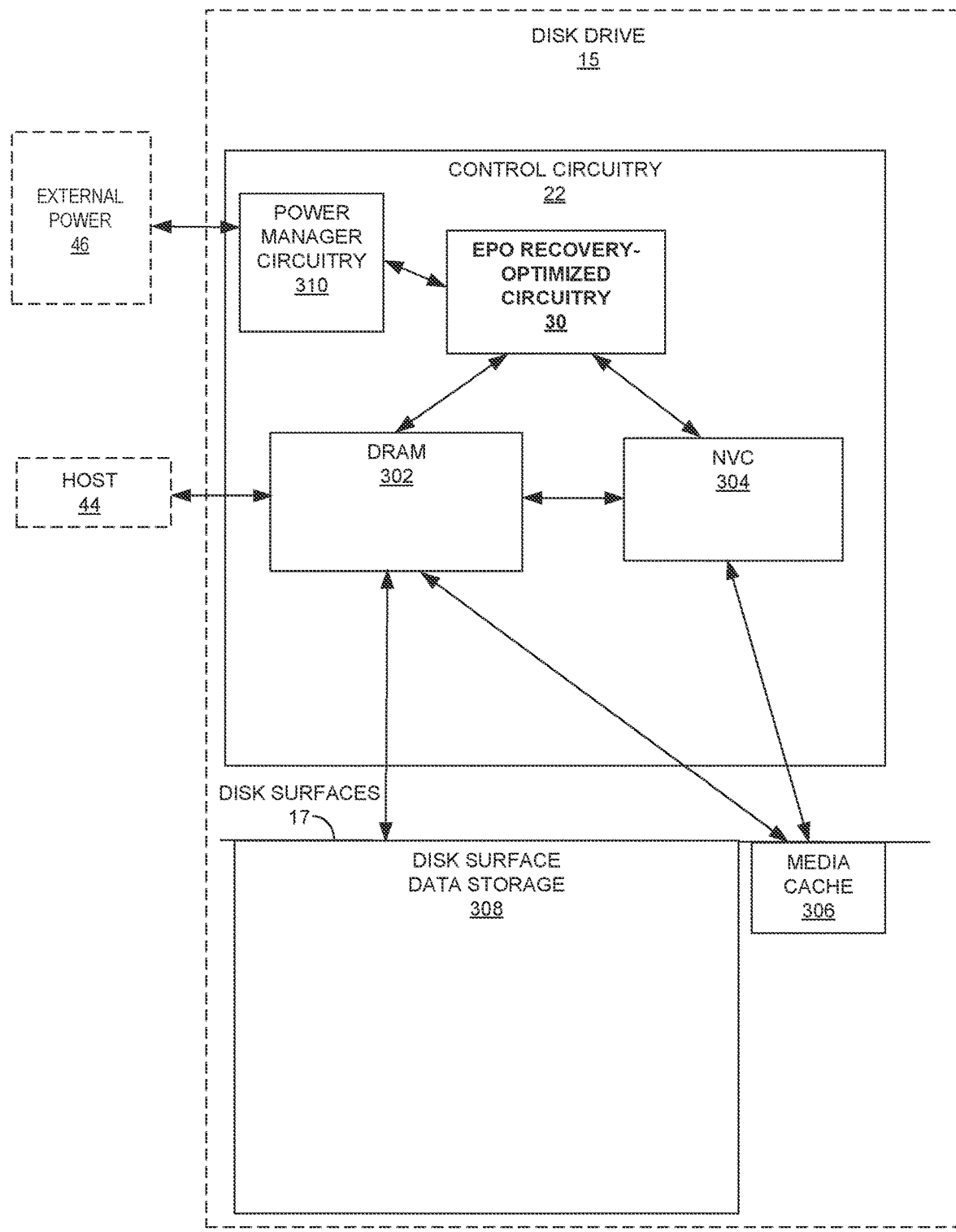
FIG. 3 depicts a basic conceptual block diagram of the memory and data storage structure of control circuitry of a disk drive, including EPO recovery-optimized circuitry of this disclosure, a memory component such as a dynamic random access memory (DRAM) and electronic non-volatile cache (NVC) comprised in control circuitry, and disk surfaces, in accordance with aspects of the present disclosure.

FIG. 3 depicts a basic conceptual block diagram of the memory and data storage structure of control circuitry 22 of disk drive 15, including EPO recovery-optimized circuitry 30 of this disclosure, a memory component such as a dynamic random access memory (DRAM) 302 and electronic non-volatile cache (NVC) 304 comprised in control circuitry 22, and disk surfaces 17, in accordance with aspects of the present disclosure. Control circuitry 22 is configured to logically reserve and use minor portions of disk surfaces 17 as a media cache (MC) 306, and to use the remaining major portions of disk surfaces 17 as disk surface data storage 308, which are the main data storage areas of disk surfaces 17, outside of servo patterns and data storage areas used as media cache 306.

Other examples may use other types of memory component rather than the example of DRAM 302. NVC 304 may be in the form of NAND flash memory, for example. DRAM 302 may be backed by NVC 304. Because media cache 306 is physically implemented in disk surfaces 17, it is also a form of non-volatile cache. Control circuitry 22 also includes power management circuitry 310, which receives electrical power from external power 46 and distributes the power to the components of disk drive 15. EPO recovery-optimized circuitry 30 is operatively coupled to DRAM 302, NVC 304, and power management circuitry 310.

Disk drive 15 receives data from host 44 via DRAM 302. In nominal operation, disk drive 15 then writes the data from DRAM 302 to data tracks of disk surface data storage 308 of disk surfaces 17. Host 44 may package logic block addresses (LBAs) together with the data, to specify the LBA locations on disk surfaces 17 to which to write each portion of data. Illustrative examples herein may be described with reference to 4K (e.g., 4,096 byte) data sectors, while disk drive control circuitry of this disclosure may be configured to use and interact with data sectors in standardized write and read lengths of other sizes in other examples within the scope of this disclosure. Advanced format (AF) disk drives may be formatted for data sectors of larger size than the traditional 512 bytes per sector. For example, various AF disk drives may be formatted for 4,096 or similar number of bytes per physical sector ("4K disk drives"), comprising approximately eight times the traditional 512 bytes per sector. 4K disk drives provide both improved areal density and improved error correction in modern large capacity disk drives, at modern data storage capacities and densities, compared to legacy disk drives that operate in the traditional 512 byte per sector standard. Because the 512 bytes per sector standard is widespread throughout computing hardware, operating systems, and firmware, 4K disk drives may include firmware to emulate 512 byte logical sectors in interfacing with the 4K physical sectors, and may be known as 512 emulation or 512e disk drives. Disk drive 15 may be a 512e disk drive, in this example. Various further example implementations of this disclosure may also use other sizes of data sectors and further formats of data sector emulation and/or native sector sizes in any combination.

Much of the data host 44 sends to disk drive 15 for storage may be sent in sets of data that each occupy one or more integral numbers of LBAs and may be inherently aligned with LBA boundaries, and thereby with physical media block address (MBA) boundaries between data sectors (e.g., 4K data sectors) on the physical media of disk surfaces 17. However, host 44 may send portions of data for storage to disk drive 15 with specified LBAs that do not align with MBA boundaries. For a newly received data block with an LBA that does not align with MBA boundaries, control circuitry 22 holds the newly received data block in DRAM 302 while control circuitry 22 performs a read operation of disk surfaces 17 of the data sector that includes the one or more logic blocks of the specified LBA. (The newly received data block may occupy one or more logic blocks beginning with the specified LBA; the one or more logic blocks beginning from the specified LBA may hereafter be referred to briefly as "the logic blocks" for the LBA, with the understanding that the logic blocks may comprise one or more logic blocks. Control circuitry 22 may also include firmware to distinguish eight separate 512-byte sector portions within each 4K data sector and to surface the 4K data sectors defined between the MBA boundaries to host 44 in terms of eight separate 512-byte sector portions. For descriptive purposes herein, a "data block" may refer to any set of data or portion of data.) Due to the interleaving of data used in logic block addressing across physical block address data track portions, control circuitry 22 needs to read the pre-existing data sector to logically interleave and integrate the head and tail subsets of the pre-existing data with the newly received data.

Control circuitry 22 then logically combines and integrates, in DRAM 302, the newly received data block with the unaligned head and/or tail data subsets of the data as read from the data sector, outside of the portion of the data sector designated by the LBA for the new data. Control circuitry 22 may thus read any one or more subsets of the data from the data sector, where the subsets of data may generally be referred to as head data and/or tail data, as subsets of data from within the data sector before or after the LBA, respectively. Control circuitry 22 thereby generates, in DRAM 302, a complete new data sector that includes the newly received data in the logic blocks specified by the LBA, and the previously existing unaligned head and tail subsets of data in the remaining logic blocks. The unaligned head data is the data read from the portion of the on-disk data sector prior to the LBA specified for the newly received data block, and the unaligned tail data is the data read from the portion of the on-disk data sector subsequent to the LBA specified for the newly received data block. (Whether or not the one or more logic blocks of the sector specified by the LBA for the newly received data block contained previous data, control circuitry 22 discards the content read from those one or more logic blocks.)

In nominal operation, control circuitry 22 then writes that newly integrated and generated data sector from DRAM 302 to the corresponding physical data sector on one of disk surfaces 17 that corresponds to the specified LBA. This location that corresponds to the specified LBA may be known as the home location of that data sector. This entire process may be referred to as a read-modify-write ("RMW") process. A complete new data sector that EPO recovery-optimized circuitry 30 has generated in DRAM 302 to integrate one or more new logic blocks of data in with the pre-existing data as read from the destination physical data sector that includes the LBA specified for the new data, may be referred to herein as a received, read, and integrated ("RRI") data sector or RRI sector. "Received, read, and integrated" refers to EPO recovery-optimized circuitry 30 having received the data from host 44, read the corresponding sector from disk surface 317, and integrated in DRAM 302 the newly received data with the unaligned head and tail data from the read sector into the new received, read, and integrated sector or RRI sector. Writing the RRI sector containing the newly received data back to the sector's home location on the media disk surface may be referred to as destaging the sector to its home location.

In rare situations, nominal operation of disk drive 15 may be interrupted, such as by an anomalous and unpredicted loss of electrical power to disk drive 15. Control circuitry 22 and EPO recovery-optimized circuitry 30 are configured to detect an anomalous loss of power via power manager circuitry 310 and to respond to the anomalous loss of power by implementing an emergency power-off (EPO) process. Since DRAM 302 is volatile, any data that disk drive 15 has received in DRAM 302 from host 44 but has not yet written to disk surfaces 17 would be lost, absent the EPO process. In the EPO process, control circuitry 22 and EPO recovery-optimized circuitry 30 respond to the emergency loss of power by seamlessly switching internal operation system power, via power manager circuitry 310, to a temporary emergency internal power source (such as by tapping the mechanical rotation of disks 17 for electrical power via back electromotive force (BEMF), and/or drawing from an internal battery, not separately depicted in FIG. 3).

In the EPO process, while powered by the emergency power source, for all data held by DRAM 302 that has not yet been written to disk surfaces 17, EPO recovery-optimized circuitry 30 writes all of that data from DRAM 302 to NVC 304, which can be done more quickly and with less power consumption than writing the data to disk surfaces 17 (and also since nominal write operations to disk surfaces 17 may be suspended by the rotation speed of disks 17 being sapped by BEMF power generation). In other examples, EPO recovery-optimized circuitry 30 may be enabled to write data from DRAM 302 to media cache 306 while operating on internal battery or prior to drawing down power from the rotation of disks 17, or otherwise write the data to another form of non-volatile cache.

In the design of conventional disk drives, it has been a consistent assumption that in the emergency conditions of the EPO process, the control circuitry should write the data that is held only in RAM and is not on the disk surfaces, to an NVC. However, among the inventive insights of this disclosure are that performance advantages can be gained by writing additional data from DRAM 302 to NVC 304, beyond just the data that only exists in DRAM 302, but also to include the entirety of any complete RRI sectors that control circuitry 22 has generated in DRAM 302 but has not yet written to disk surfaces 17, even though this involves saving some data from DRAM 302 to NVC 304 that is already safely stored on disk surfaces 17. These inventive insights run contrary to the conventional assumption that, in an emergency power loss, with very little time and very little internal emergency power, and where prior to the invention of EPO process technology, there would have been a catastrophic complete loss of data, the disk drive should focus on saving the data that only exists in RAM to an electronic NVC, and not spend some of its constrained remaining reserve of time and power writing blocks of data from RAM to NVC that are already stored on disk. However, among the inventive insights of this disclosure, disk drive 15 of this disclosure may be configured with ample emergency internal power to enable EPO recovery-optimized circuitry 30 to perform a recovery-optimized emergency response process or EPO process for all applicable data, within the emergency reserves of time and power available.

In its recovery-optimized emergency response process, in response to detecting the emergency loss of power, EPO recovery-optimized circuitry 30 may identify all RRI sectors that happen to be in DRAM 302 and not yet written to disk surfaces 17, and writes all of those RRI sectors to NVC 304, even though they include substantial portions of data that are also already written to disk surfaces 17. In this manner, EPO recovery-optimized circuitry 30 not only saves, for permanent storage, all of the data that only exists in DRAM 302 at the point of emergency loss of power, but also accelerates and optimizes the later recovery process, once nominal power is restored to disk drive 15.

By saving the complete RRI sectors to NVC 304, EPO recovery-optimized circuitry 30 provides for the complete RRI sectors to be ready to rapidly write to disk surfaces 17 as soon as nominal power is restored, whereas conventional disk drives have to repeat the RMW process for all recovered unaligned data that had been recently received and not yet written to disk when the emergency loss of power occurred. That is, for each set of logic blocks of recovered unaligned data, conventional disk drives must repeat the process of performing a new read operation of the destination data sector that includes the designated LBA of the recovered data, integrate the recovered data with the data as read from the destination data sector, and then write the new RRI sector thus generated to the destination data sector. This requires at least one full mechanical rotation of the disk stack between the read operation and the write operation, which may be the limiting constraint on the speed of completing the recovery of the data, relative to the electronic processing of the other steps in the data recovery process.

In contrast, in response to detecting the emergency loss of power, EPO recovery-optimized circuitry 30 of this disclosure saves all of the existing complete RRI sectors for recently received data, and any other recently received data, from DRAM 302 to NVC 304. When nominal power is later restored, EPO recovery-optimized circuitry 30 detects the restoration of nominal power, and in response to detecting the restoration of nominal power, EPO recovery-optimized circuitry 30 promptly loads the ready RRI sectors back from NVC 304 to DRAM 302. This may also include first loading the RRI sectors from NVC 304 to media cache 306, then from media cache 306 to DRAM 302, in some examples. First loading the RRI sectors from NVC 304 to media cache 306, then from media cache 306 to DRAM 302, may be advantageous in some examples because it may be the fastest way to transfer the data from NVC 304 to another form of non-volatile cache, and free up the storage space of NVC 304 for nominal operations, prior to proceeding. EPO recovery-optimized circuitry 30 may also load the ready RRI sectors directly back from NVC 304 to DRAM 302, in other examples. In either case, EPO recovery-optimized circuitry 30 may then write the complete RRI sectors to their destination physical data sectors on disk surfaces 17 as soon as post-emergency nominal disk rotation is restored, within the first revolution of the stack of disks 16.

EPO recovery-optimized circuitry 30 thereby implements substantially faster post-emergency recovery than is possible in conventional disk drives, to having all data received by disk drive 15 prior to emergency being nominally long-term stored on disk surfaces 17 post-recovery, among other advantages of this disclosure. While examples depicted herein illustrate EPO recovery-optimized circuitry 30 managing only one or a few blocks of newly received data in EPO and recovery processes, for purposes of clear conceptual description, disk drive 15 may at any time have hundreds, thousands, or other large numbers of recently received sets of data from host 44 in DRAM 302 and not yet written to disk. In illustrative examples, disk drive 15 may use any of various encoding schemes, and may at any time have up to hundreds, thousands, tens of thousands, hundreds of thousands, or other large numbers of recently received sets of data loaded in DRAM 302 and not yet written to disk, which EPO recovery-optimized circuitry 30 needs to manage in an EPO process. Conventional disk drives with encoding schemes performing a post-EPO recovery process may need to perform post-EPO read and integration operations for complete data sectors from disk for up to large numbers of recently received sets of data loaded in DRAM 302. In contrast, EPO recovery-optimized circuitry 30 enables many or all of those up to hundreds, thousands, tens of thousands, hundreds of thousands, or other large numbers of sets of data to already be packaged into RRI sectors already ready for writing to disk in the post-EPO recovery process. EPO recovery-optimized circuitry 30 may thus enable substantially faster post-EPO recovery process and return to nominal data read/write operations for disk drive 15.

FIGS. 4A-4F depict conceptual view details of the processes described above of data being managed by EPO recovery-optimized circuitry 30 in an example recovery-optimized EPO and optimized post-emergency recovery process that EPO recovery-optimized circuitry 30 may perform. FIGS. 4A-4F depict an indicative example, and EPO recovery-optimized circuitry 30 may further perform any of a wide variety of recovery-optimized EPO and post-emergency recovery processes, in various examples comprised within the scope of this disclosure.

Figure 4A:
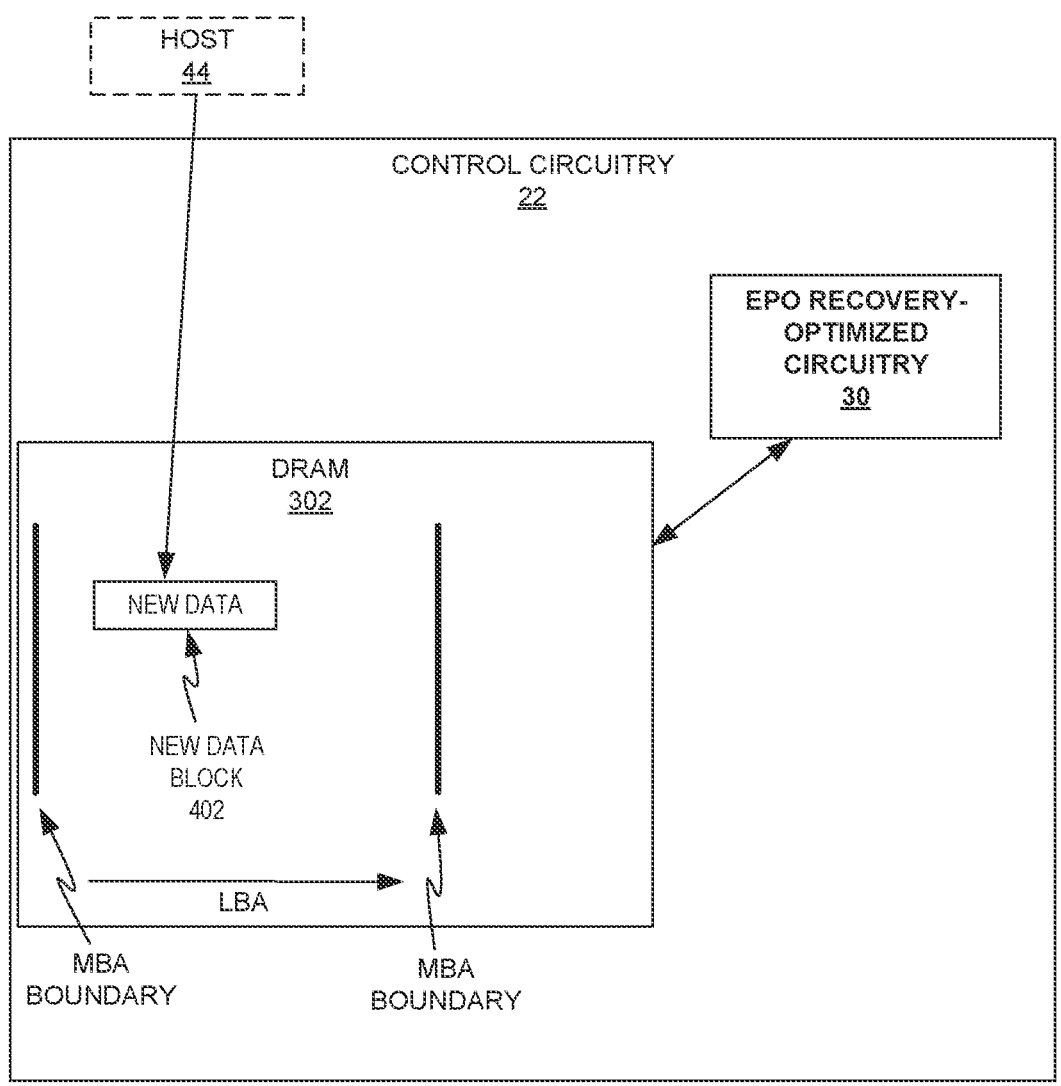
FIG. 4A illustrates a conceptual view of an incoming block of unaligned data in RAM of a disk drive, which the disk drive has received from a host for recording to the disk drive, in accordance with aspects of the present disclosure.

FIG. 4A illustrates a conceptual view of an incoming block of unaligned data 402 in RAM 302 of disk drive 15, which disk drive 15 has received from host 44 for recording to disk drive 15, in accordance with aspects of the present disclosure. While the incoming block of unaligned data 402 is here just received and loaded in DRAM 302, it is conceptually depicted geometrically arranged in a position in DRAM 302 corresponding with its designated LBA on a track and a data sector to be written to on disk surfaces 17, and relative to MBA boundaries. While most incoming blocks of data may be expected to cover one or more data sectors and to be aligned with MBA boundaries, the example block of unaligned data 402 shown in FIG. 4A is smaller than a single data sector and begins and ends away from MBA boundaries, and is thus not aligned with MBA boundaries. In particular, data block 402 has an LBA address that designates it as beginning away from an MBA boundary, and ending before the subsequent MBA boundary. EPO recovery-optimized circuitry 30 may detect the reception of the newly received data, and in response to the receiving of the data, may perform a read operation of the data sector on disk that contains the indicated LBA.

Figure 4B:
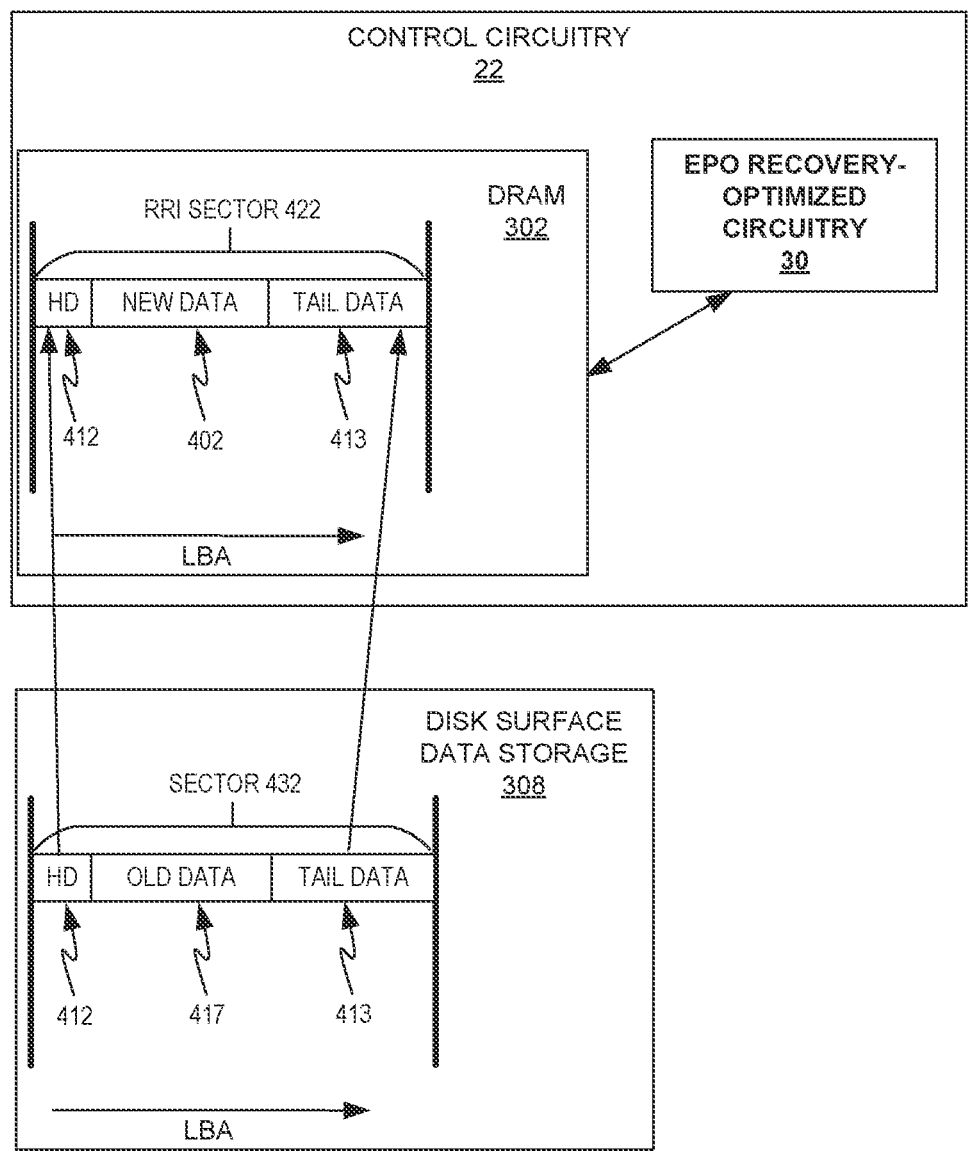
FIG. 4B illustrates a conceptual view of EPO recovery-optimized circuitry performing a read operation of a data sector on disk that contains an indicated logic block address (LBA), in accordance with aspects of the present disclosure.

FIG. 4B illustrates a conceptual view of EPO recovery-optimized circuitry 30 performing a read operation of the data sector 432 on disk that contains the indicated LBA, in accordance with aspects of the present disclosure. EPO recovery-optimized circuitry 30 performs the read operation of data sector 432 from data storage 308 of disk surfaces 17. EPO recovery-optimized circuitry 30 incorporates the subset of data comprising the unaligned head data 412 and unaligned tail data 413 together with newly received data 402 to generate, in DRAM 302, a complete RRI sector 422 that includes the newly received data 402. EPO recovery-optimized circuitry 30 discards the old data 417 from the read operation (which may be old data or blank space with null data) that occupies the logic blocks designated by the LBA for writing the newly received data 402, and are thus to be overwritten.

In nominal operation, control circuitry 22 would then write newly generated and integrated RRI sector 422 from DRAM 302 to the designated logic blocks on disk surfaces 17, on disk surface data storage 308. In this example, however, EPO recovery-optimized circuitry 30 detects an emergency loss of power at this point, when RRI sector 322 is held in RAM 302 but not yet written to disk. Instead, EPO recovery-optimized circuitry 30 initiates its recovery-optimized EPO response process.

Figure 4C:
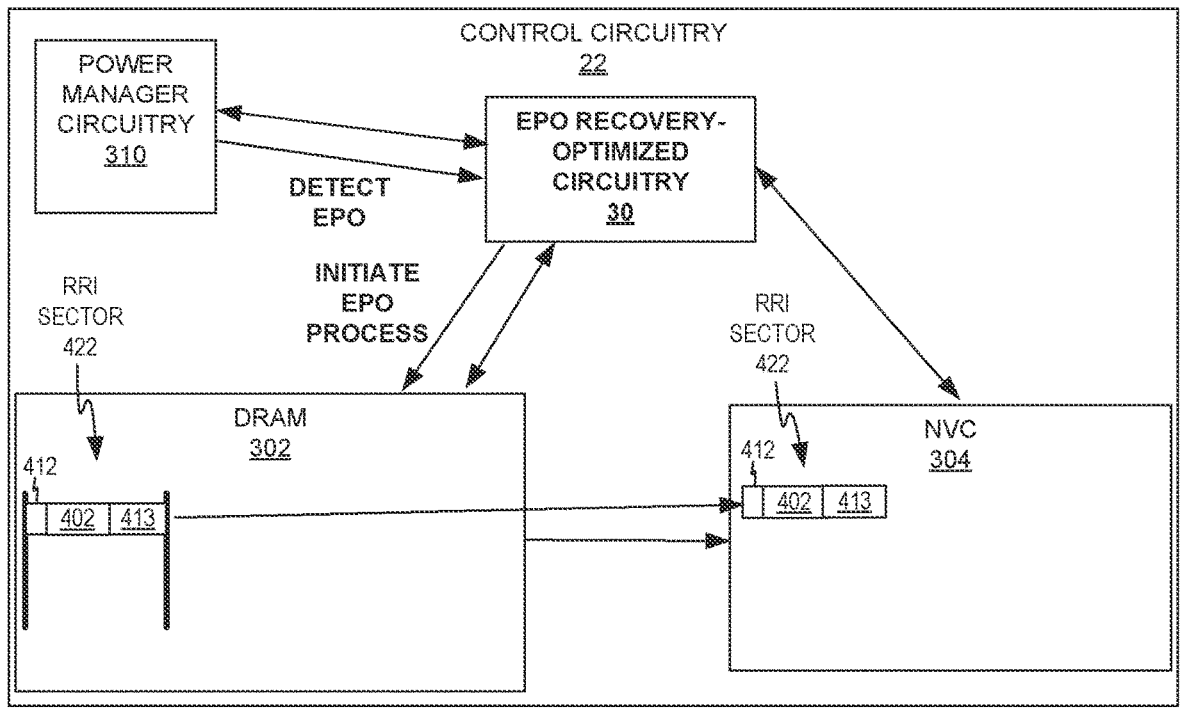
FIG. 4C illustrates a conceptual view of EPO recovery-optimized circuitry detecting, via power manager circuitry, an emergency loss of power, and initiating its recovery-optimized EPO response process, in accordance with aspects of the present disclosure.

FIG. 4C illustrates a conceptual view of EPO recovery-optimized circuitry 30 detecting, via power manager circuitry 310, an emergency loss of power, and initiating its recovery-optimized EPO response process, in accordance with aspects of the present disclosure. EPO recovery-optimized circuitry 30 controls DRAM 302 to load RRI sector 422 from DRAM 302 to NVC 304. NVC 304 may comprise any one or more NBC components comprised in disk drive 15. In other examples, EPO recovery-optimized circuitry 30 controls DRAM 302 to load RRI sector 422 from DRAM 302 to one or more other emergency cache or non-volatile memory or data storage components, such as one or more additional external NVC components, or media cache 306, in examples in which that is consistent with an emergency response process. EPO recovery-optimized circuitry 30 controls DRAM 302 to load up to large numbers of fully or partly integrated RRI sectors to any one or more cache components or other memory or data storage components in an emergency EPO process, in various examples.

Figure 4D:
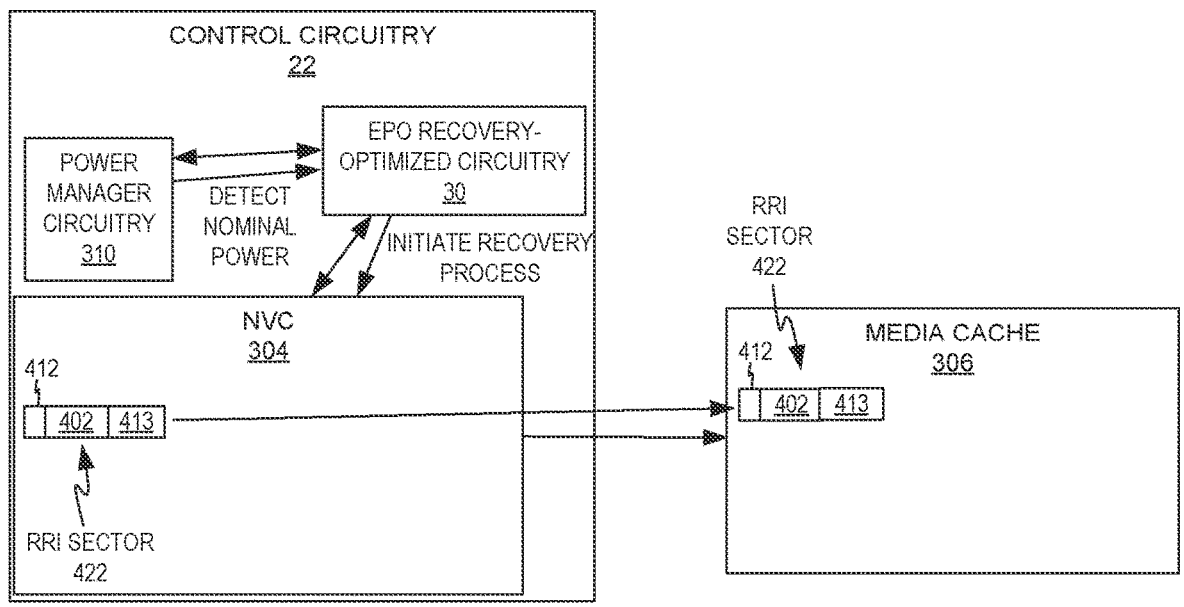
FIG. 4D illustrates a conceptual view of EPO recovery-optimized circuitry detecting, via power manager circuitry, a restoration of nominal power supply to disk drive, in accordance with aspects of the present disclosure.

FIG. 4D illustrates a conceptual view of EPO recovery-optimized circuitry 30 subsequently detecting, via power manager circuitry 310, a restoration of nominal power supply to disk drive 15, in accordance with aspects of the present disclosure. In response to this, EPO recovery-optimized circuitry 30 reads RRI sector 422 from NVC 304 and writes RRI sector 422 to media cache 306, in this example. Writing RRI sector 422 from NVC 304 to media cache 306 may yield advantages, such as quickly transferring RRI sector 422 to another non-volatile form of cache, and in fact writing RRI sector 422 to disk, before any other step in this example (just not yet at its designated LBA), while freeing up space in NVC 304 for nominal operations with NVC 304.

Figure 4E:
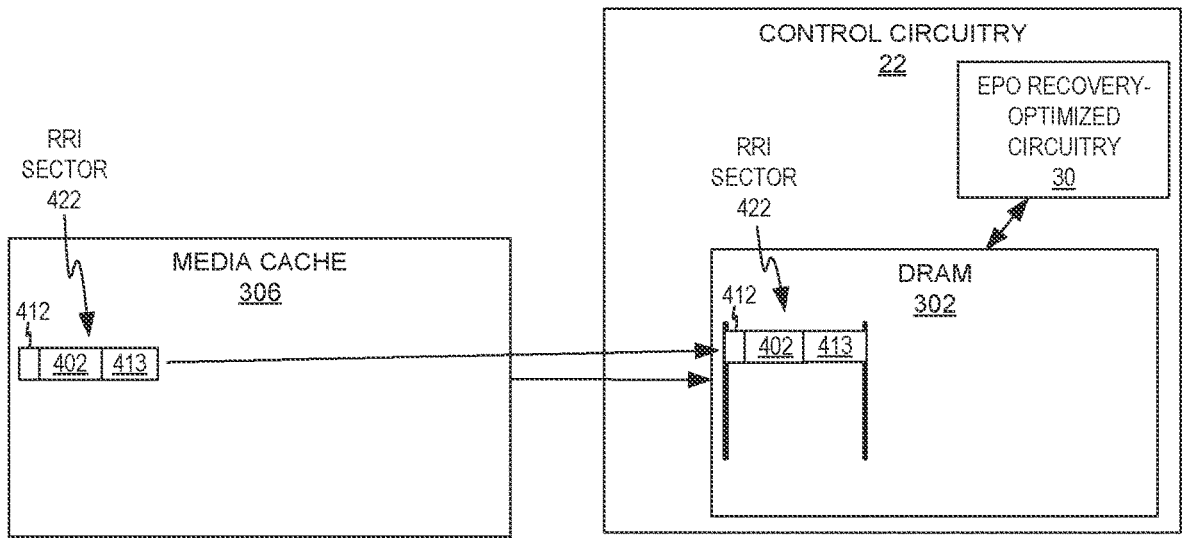
FIG. 4E illustrates a conceptual view of EPO recovery-optimized circuitry reading an RRI sector from a media cache to DRAM, in accordance with aspects of the present disclosure.
Figure 4F:
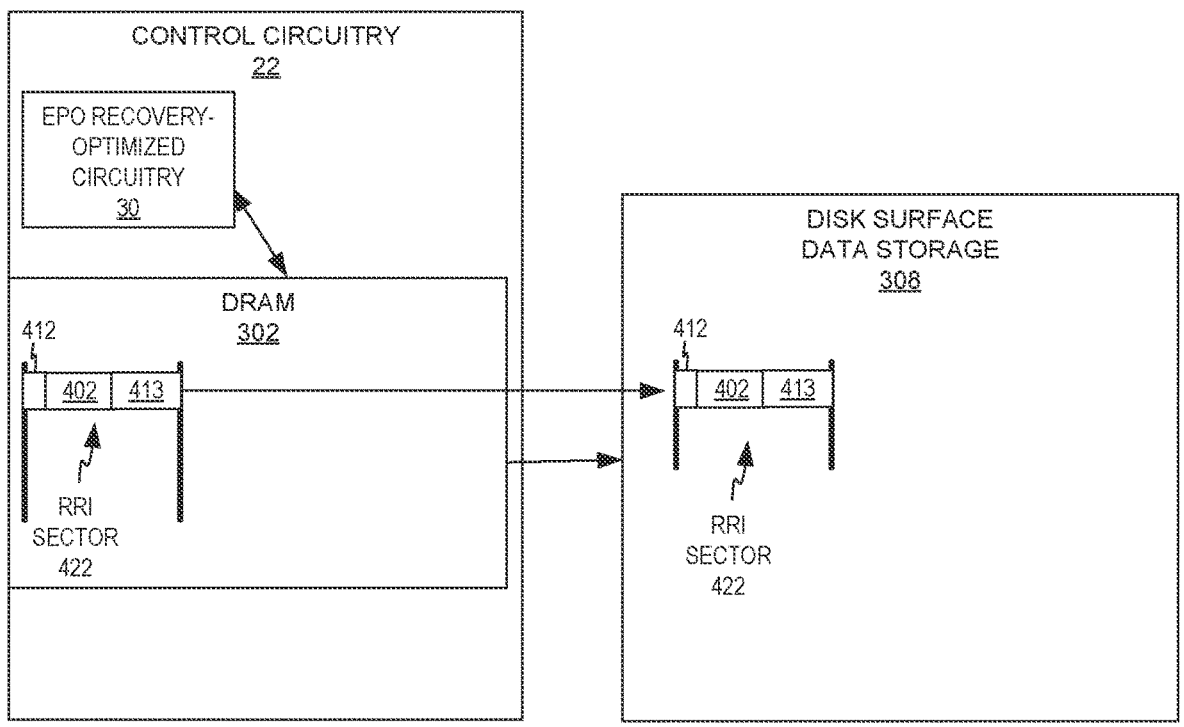
FIG. 4F illustrates a conceptual view of EPO recovery-optimized circuitry reading an RRI sector from DRAM and writing the RRI sector from DRAM to disk surface data storage of the disk surfaces, with an unaligned data block written at the track and unique LBA on disk surfaces designated by the LBA indicated by the host for the data, and with head data and tail data rewritten to their same locations on disk as before, in accordance with aspects of the present disclosure.

FIG. 4E illustrates a conceptual view of EPO recovery-optimized circuitry 30 subsequently reading RRI sector 422 from media cache 306 to DRAM 302, in accordance with aspects of the present disclosure. FIG. 4F illustrates a conceptual view of EPO recovery-optimized circuitry 30 subsequently reading RRI sector 422 from DRAM 302 and writing RRI sector 422 from DRAM 302 to disk surface data storage 308 of disk surfaces 17, with unaligned data block 402 written at the track and unique LBA on disk surfaces 17 designated by the LBA indicated by host 44 for data 402, and with head data 412 and tail data 413 rewritten to their same locations on disk as before, in accordance with aspects of the present disclosure. This writing of the complete RRI sector 422 from DRAM 302 is advantageous over conventional disk drives, which would have to perform a fresh read of the same data sector on disk and a fresh integration of the new data with the pre-existing unaligned head and tail data into an RRI sector, after resumption of nominal power, as part of the recovery process, prior to being able to write the new data to disk at the designated LBA. EPO recovery-optimized circuitry 30 thus enables accelerated post-power-loss recovery, faster than conventional disk drives are capable of, among other advantages.

In some examples, when emergency loss of power strikes, EPO recovery-optimized circuitry 30 may have generated RRI sectors for all pending recently received data received from host 44 that control circuitry 22 has not yet had a chance to write to disk. In these cases, in its EPO process, EPO recovery-optimized circuitry 30 may write all pending recently received data from DRAM 302 to NVC 304 in the form of RRI sectors. In other examples, when emergency loss of power strikes, EPO recovery-optimized circuitry 30 may not yet have generated complete RRI sectors for all pending recently received data received from host 44 that control circuitry 22 has not yet had a chance to write to disk. In various examples, when emergency loss of power strikes, EPO recovery-optimized circuitry 30 may have one or more partially generated RRI sectors for some pending recently received data received from host 44 that control circuitry 22 has not yet had a chance to finish integrating into complete RRI sectors and write to disk. In these cases, in its EPO process, EPO recovery-optimized circuitry 30 may write the pending RRI sectors that it has generated from DRAM 302 to NVC 304, while writing the remaining data blocks that it has not yet been able to incorporate into RRI sectors from DRAM 302 to NVC 304 in the form of the individual data blocks, and writing any partially generated or partially integrated RRI sectors that it has not yet been able to finish integrating into complete RRI sectors from DRAM 302 to NVC 304 in the form of the partially generated RRI sectors.

FIGS. 5A-5G depict conceptual view details of data being managed by EPO recovery-optimized circuitry 30 in another example recovery-optimized EPO and optimized post-emergency recovery process that EPO recovery-optimized circuitry 30 performs, analogous to the example described above but involving multiple blocks of data, and not all of which yet being integrated into RRI sectors when the loss of power strikes. FIGS. 5A-5G depict another illustrative example of EPO recovery-optimized circuitry 30 performing a recovery-optimized EPO and post-emergency recovery processes. The example of FIGS. 5A-5G conceptually depicts EPO recovery-optimized circuitry 30 managing three recently received sets of data, for the sake of conceptual depiction with clarity. In practice, EPO recovery-optimized circuitry 30 may handle single digit numbers, tens, hundreds, thousands, tens of thousands, hundreds of thousands, or any physically possible number of different sets of data received in DRAM 302 from host 44 and not yet written to disk at the time of emergency loss of power, in various examples in accordance with aspects of this disclosure.

Figure 5A:
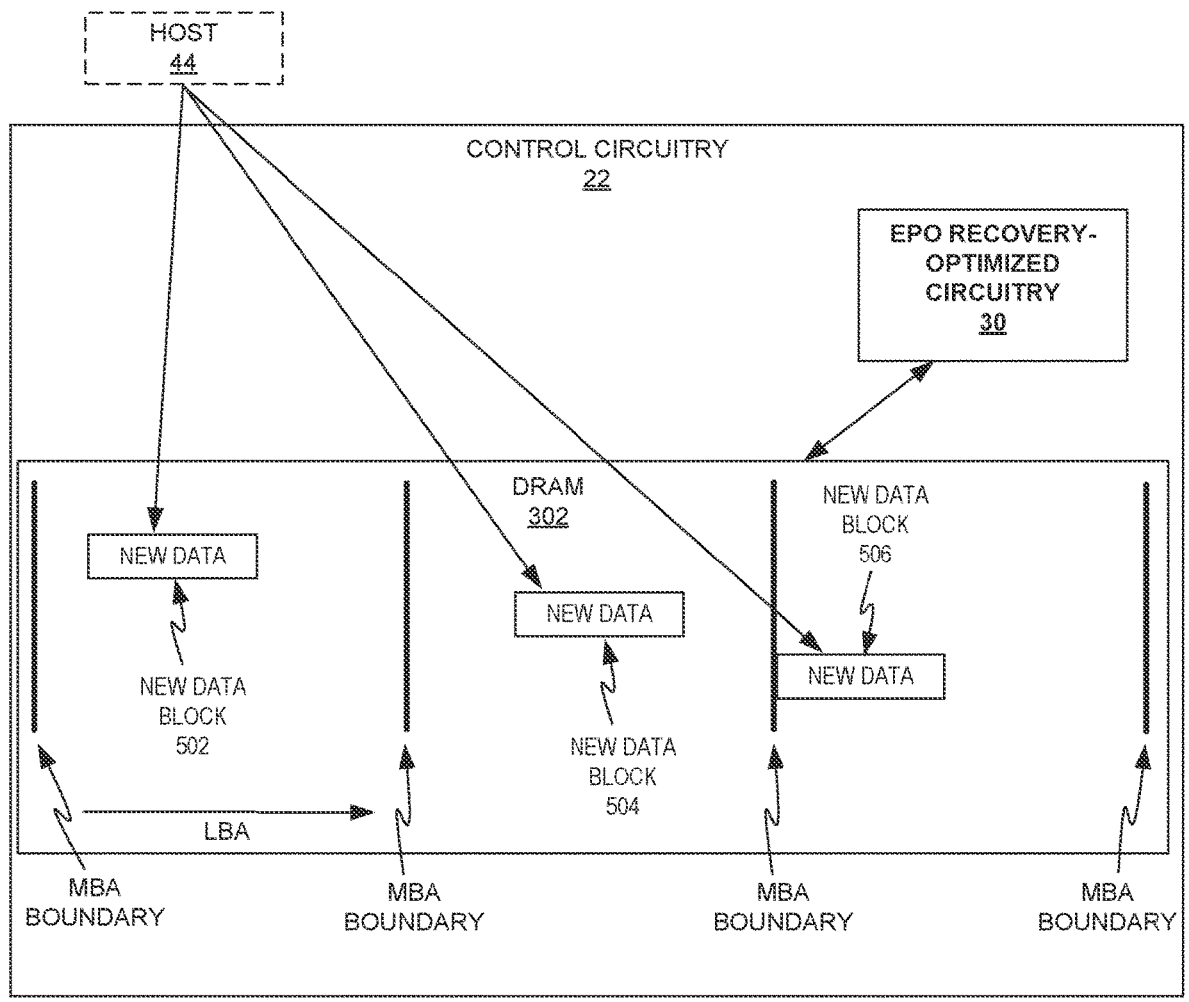
FIG. 5A illustrates a conceptual view of incoming blocks of unaligned data in RAM of the disk drive, which the disk drive has received from a host for recording to the disk drive, in accordance with aspects of the present disclosure.

FIG. 5A illustrates a conceptual view of incoming blocks of unaligned data 502, 504, 506 in RAM 302 of disk drive 15, which disk drive 15 has received from host 44 for recording to disk drive 15, in accordance with aspects of the present disclosure. While the incoming blocks of unaligned data 502, 504, 506 are here just received and loaded in DRAM 302, they are conceptually depicted geometrically arranged in relative positions in DRAM 302 corresponding with their designated LBAs on tracks and data sectors to be written to on disk surfaces 17, and relative to MBA boundaries.

As in the example described above, each of the example blocks of unaligned data 502, 504, 506 shown in FIG. 5A are smaller than a single data sector, and mostly beginning and ending away from MBA boundaries, and are thus not aligned with MBA boundaries. In particular, data block 506 has an LBA address that designates it as beginning at an MBA boundary, while data blocks 502 and 504 have LBA addresses that designate them as beginning away from an MBA boundary, and all three illustrative data blocks 502, 504, 506 end before a subsequent MBA boundary. EPO recovery-optimized circuitry 30 may detect the reception of the newly received data blocks 502, 504, 506, and in response to the receiving of the data blocks 502, 504, 506, may perform a read operation of the data sectors on disk that contain the indicated LBAs for each of data blocks 502, 504, 506.

Figure 5B:
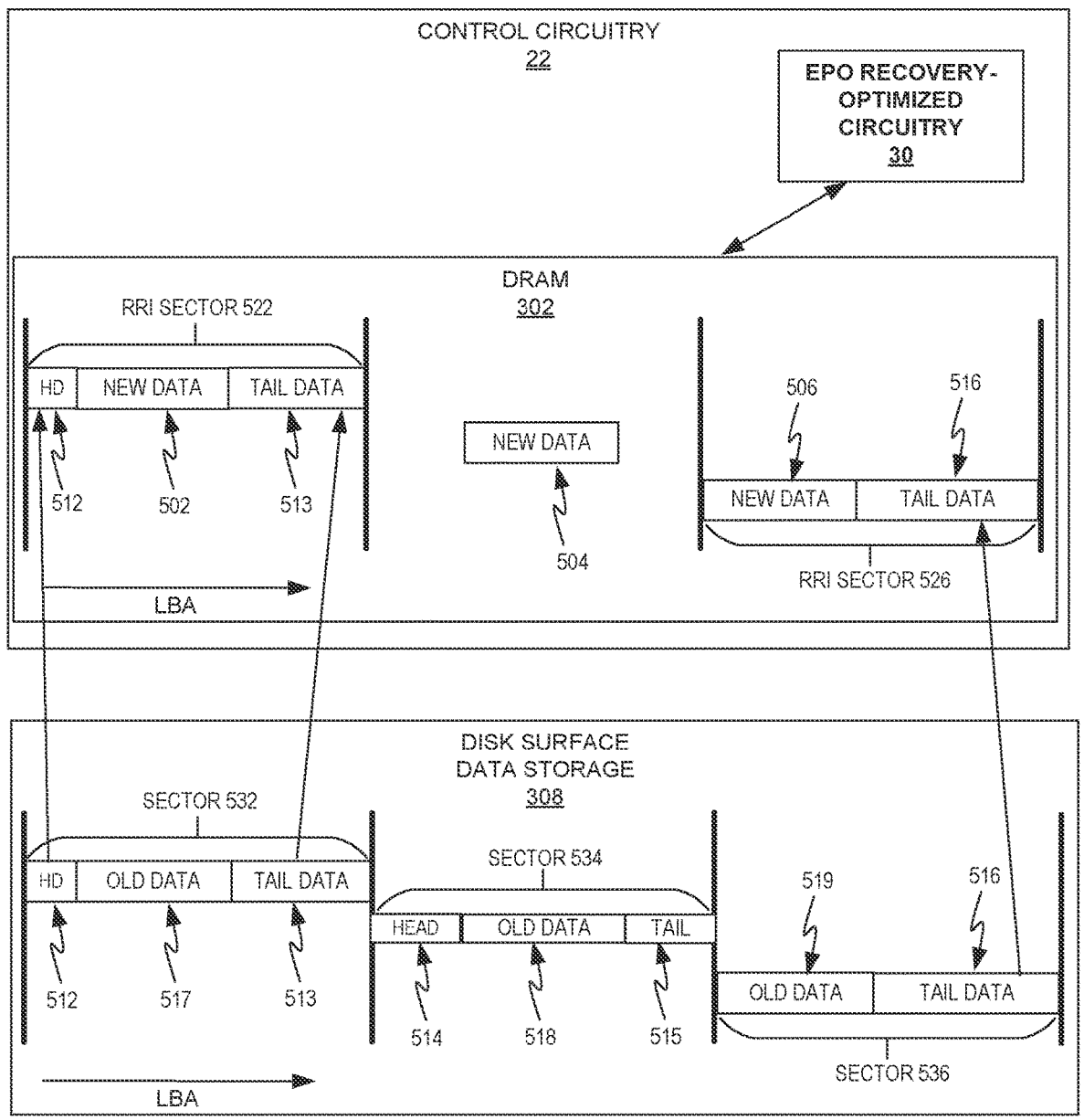
FIG. 5B illustrates a conceptual view of EPO recovery-optimized circuitry attempting to perform read operations of data sectors on disk that contain the respective indicated LBAs for data blocks, in accordance with aspects of the present disclosure.

FIG. 5B illustrates a conceptual view of EPO recovery-optimized circuitry 30 attempting to perform read operations of data sectors 532, 534, 536 on disk that contain the respective indicated LBAs for data blocks 502, 504, 506, in accordance with aspects of the present disclosure. EPO recovery-optimized circuitry 30 attempts to perform the read operations of data sectors 532, 534, 536 from data storage 308 of disk surfaces 17. FIG. 5B illustrates a view of blocks of recently received unaligned blocks of data 502, 504, 506 in DRAM 302 while EPO recovery-optimized circuitry 30 is in the midst of reading their designated home data sectors from disk surfaces 17 and integrating them with head and tail data from those sets of data read from the designated home data sectors into RRI sectors.

In the example of the state depicted in FIG. 5B, EPO recovery-optimized circuitry 30 has read the data from the home sectors of blocks of unaligned blocks of data 502 and 506. EPO recovery-optimized circuitry 30 has integrated home sector head and tail data from the disk data sector comprising the LBA for data block 502 together with data block 502 into an RRI sector for data block 502. EPO recovery-optimized circuitry 30 has analogously integrated home sector tail data from the disk data sector comprising the LBA for data block 506 together with data block 506 into an RRI sector for data block 506, where there is no head data since data block 506 is addressed with an LBA that begins at an MBA boundary. In the state depicted in FIG. 5B, EPO recovery-optimized circuitry 30 has not yet had a chance to integrate home sector head and tail data from the disk data sector comprising the LBA for data block 504 together with data block 504 into an RRI sector for data block 404. In the state depicted in FIG. 5B, EPO recovery-optimized circuitry 30 has thus just read data sectors 532 and 536, and has not quite yet gotten to reading data sector 534.

EPO recovery-optimized circuitry 30 incorporates the unaligned head data 512 and unaligned tail data 513 from data sector 532 together with newly received data 502, and the unaligned tail data 516 from data sector 536 together with newly received data 506, to generate, in DRAM 302, complete RRI sectors 522, 526, which respectively include the newly received data blocks 502, 506. EPO recovery-optimized circuitry 30 discards the old data 517, 519 from the read operations, which are to be overwritten.

In nominal operation, control circuitry 22 would then also read data sector 534 and integrate head and tail data 514, 515 with newly received data block 504, and write newly generated and integrated RRI sectors 522 and 526 and an RRI sector covering data block 504 from DRAM 302 to the designated logic blocks on disk surfaces 17, on disk surface data storage 508. In this example, however, EPO recovery-optimized circuitry 30 detects an emergency loss of power at this point, when RRI sectors 522 and 526 and unintegrated data block 504 are held in RAM 302 but not yet written to disk. Instead, EPO recovery-optimized circuitry 30 initiates its recovery-optimized EPO response process. The state depicted in FIG. 5B may thus be a state that the incoming data blocks in DRAM 302 are in when a sudden, unpredicted emergency loss of power occurs.

Figure 5C:
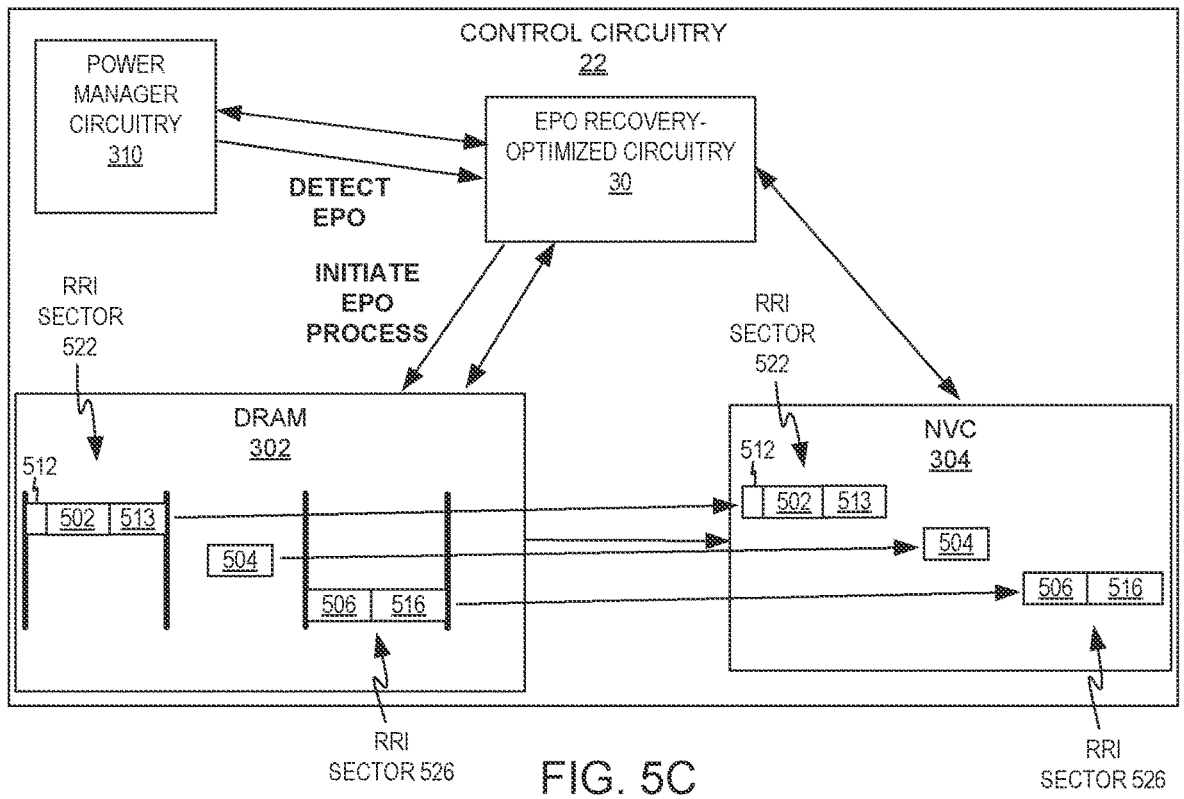
FIG. 5C conceptually depicts the response of EPO recovery-optimized circuitry to an emergency loss of power, in accordance with aspects of the present disclosure.

FIG. 5C conceptually depicts the response of EPO recovery-optimized circuitry 30 to the emergency loss of power, in accordance with aspects of the present disclosure. In response to detecting the emergency loss of power, EPO recovery-optimized circuitry 30 promptly or immediately stops performing integration of the newly received data blocks with unaligned home sector head and tail data and instead writes all data, including complete, processed RRI data sectors and unprocessed unaligned data blocks, to NVC 304.

FIG. 5C thus illustrates a conceptual view of EPO recovery-optimized circuitry 30 detecting, via power manager circuitry 310, an emergency loss of power, and initiating its recovery-optimized EPO response process. FIG. 5C shows that EPO recovery-optimized circuitry 30 may still be in the middle of integrating newly incoming data with unaligned head and tail data read from the designated data sectors of disk surfaces 17, so that EPO recovery-optimized circuitry 30 has generated some complete RRI data sectors in DRAM for writing to the designated data sectors of disk surfaces 17, but also has one incoming block of data in DRAM that EPO recovery-optimized circuitry 30 has not yet had a chance to integrate with unaligned head and tail data from its target data sector, when emergency loss of power strikes. EPO recovery-optimized circuitry 30 controls DRAM 302 to load RRI sectors 522 and 526 and unaccompanied data block 504 from DRAM 302 to NVC 304.

Figure 5D:
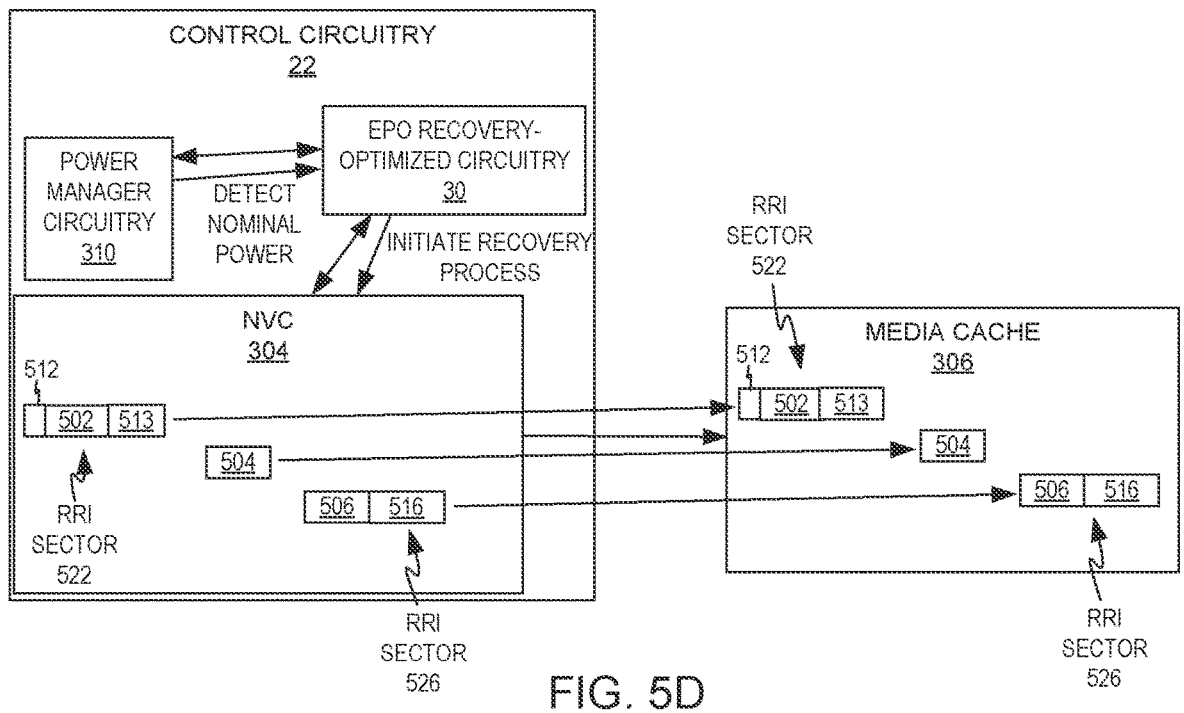
FIG. 5D illustrates a conceptual view of EPO recovery-optimized circuitry subsequently detecting, via power manager circuitry, a restoration of nominal power supply to the disk drive, in accordance with aspects of the present disclosure.

FIG. 5D illustrates a conceptual view of EPO recovery-optimized circuitry 30 subsequently detecting, via power manager circuitry 310, a restoration of nominal power supply to disk drive 15, in accordance with aspects of the present disclosure. In response to this, EPO recovery-optimized circuitry 30 reads RRI sectors 522 and 526 and unaccompanied data block 504 from NVC 304 and writes RRI sectors 522 and 526 and unaccompanied data block 504 to media cache 306, in this example.

Figure 5E:
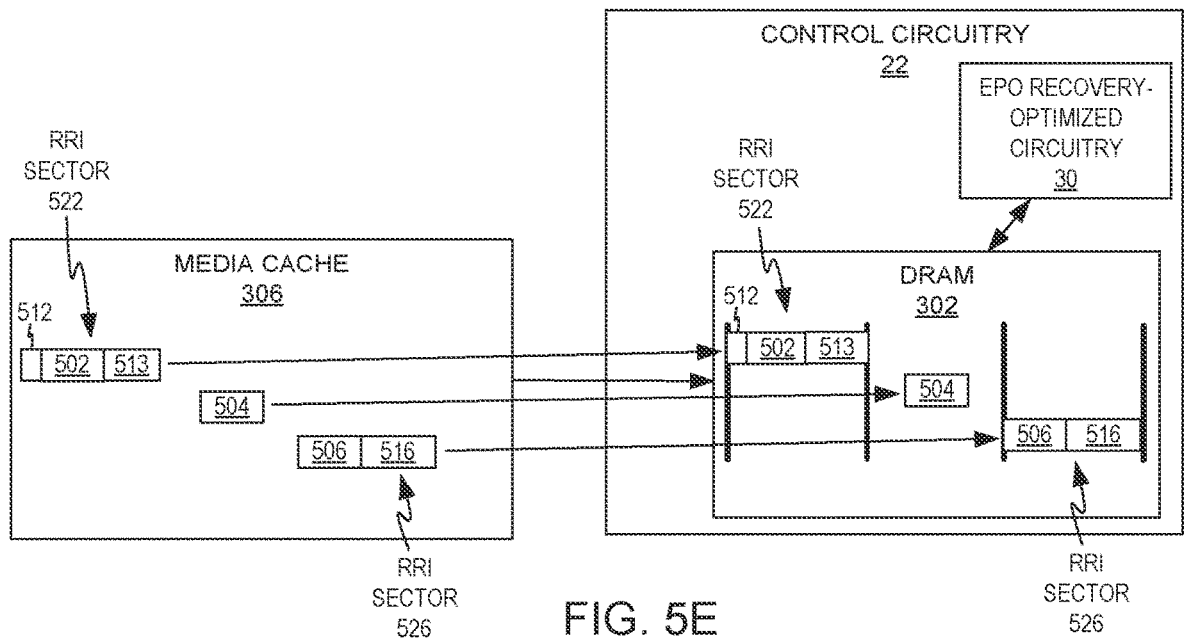
FIG. 5E illustrates a conceptual view of EPO recovery-optimized circuitry subsequently reading RRI sectors and an unaccompanied data block from media cache to DRAM, in accordance with aspects of the present disclosure.

FIG. 5E illustrates a conceptual view of EPO recovery-optimized circuitry 30 subsequently reading RRI sectors 522 and 526 and unaccompanied data block 504 from media cache 306 to DRAM 302, in accordance with aspects of the present disclosure. Then, now that EPO recovery-optimized circuitry 30 has unaccompanied data block 504 back in DRAM 502 post-outage, as part of the recovery process, EPO recovery-optimized circuitry 30 has an opportunity to complete the process of packaging the new unaligned data into complete RRI sectors, as shown in FIG. 5F.

Figure 5F:
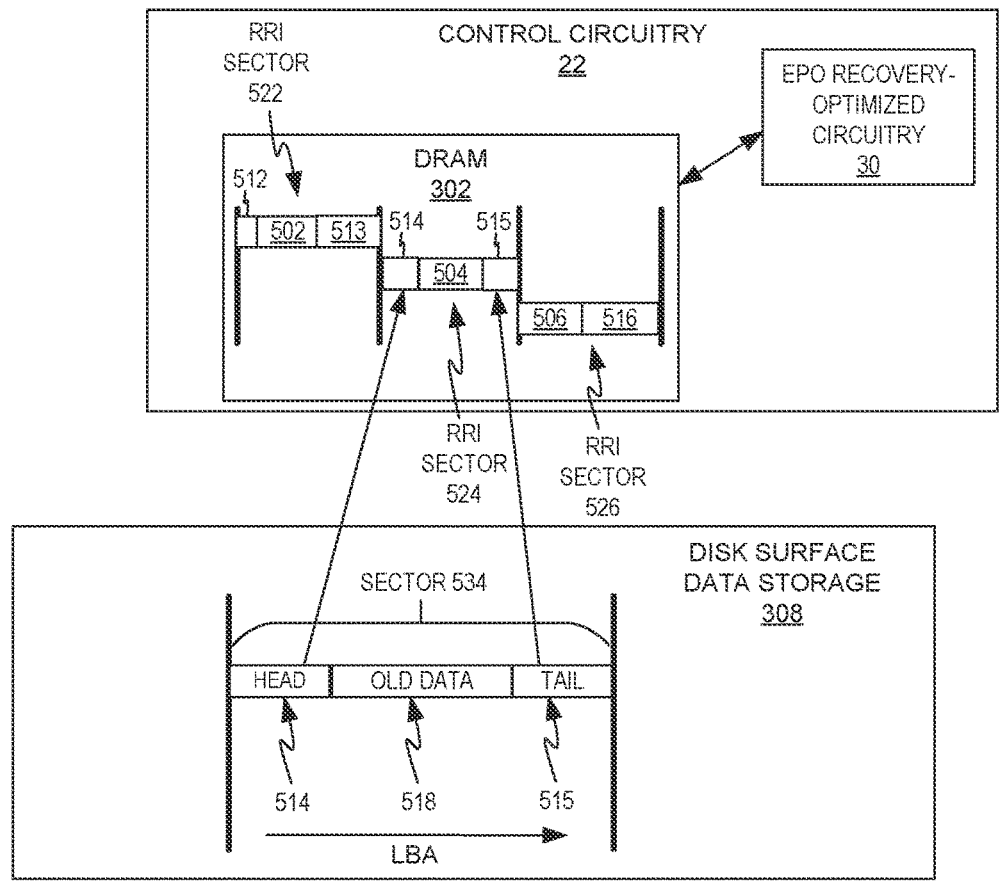
FIG. 5F illustrates a conceptual view of EPO recovery-optimized circuitry performing a read operation of a data sector on disk, which contains the indicated LBA for a data block, since EPO recovery-optimized circuitry prior to the emergency power outage was interrupted and prevented from reading the data sector, in accordance with aspects of the present disclosure.

FIG. 5F illustrates a conceptual view of EPO recovery-optimized circuitry 30 performing a read operation of data sector 534 on disk, which contains the indicated LBA for data block 504, since EPO recovery-optimized circuitry 30 prior to the emergency power outage was interrupted and prevented from reading data sector 534, in accordance with aspects of the present disclosure. EPO recovery-optimized circuitry 30 now performs a read operation of data sector 534 from data storage 308 of disk surfaces 17. In the state depicted in FIG. 5F, EPO recovery-optimized circuitry 30 reads data sector 534, and incorporates the unaligned head data 514 and unaligned tail data 515 from data sector 534 together with data block 504. EPO recovery-optimized circuitry 30 then generates, in DRAM 302, complete RRI sector 524, which includes data block 504 packaged together with unaligned head and tail data 514, 515. EPO recovery-optimized circuitry 30 discards the old data 518 from the read operations. EPO recovery-optimized circuitry 30 thus completes the interrupted process of packaging all of the data suspended in DRAM 302 at the time of the power outage into complete RRI sectors for writing to data sectors on disk. EPO recovery-optimized circuitry 30 still completes this process more quickly during recovery than in conventional disk drives, since EPO recovery-optimized circuitry 30 only has to perform reading from disk and packaging into RRI sectors for new data it didn't have the chance to integrate into complete RRI sectors prior to power loss, instead of having to integrate all new data as part of the recovery process.

EPO recovery-optimized circuitry 30 may also perform these processes in cases of partially completed or partially generated RRI sectors, where EPO recovery-optimized circuitry 30 has begun but has not yet completed the process of integrating home sector head and/or tail data from the disk data sector comprising the LBA for the new data block together with the new data block into an RRI sector for the new data block, when EPO recovery-optimized circuitry 30 detects the emergency loss of power and switches to performing the EPO process. For example, in an example process otherwise analogous to that depicted in FIG. 5B, EPO recovery-optimized circuitry 30 may have gotten a little farther in its process of assembling data into RRI sectors than in the example of FIG. 5B described above, and may have integrated head data 514 from sector 534 together with new data 504 into a partly integrated RRI sector, but may not yet have read and integrated tail data 515 from sector 534 into the new RRI sector, when EPO recovery-optimized circuitry 30 detects that power has been lost. In another example, EPO recovery-optimized circuitry 30 may have integrated tail data 515 from sector 534 together with new data 504 into a partly integrated RRI sector, but may not yet have read and integrated head data 514 from sector 534 into the new RRI sector, when EPO recovery-optimized circuitry 30 detects that power has been lost. In examples such as these, EPO recovery-optimized circuitry 30 may, in response to detecting the loss of power, save the one or more partly integrated RRI sectors from DRAM 302 to NVC 304, and in a later recovery process, recover the one or more partly integrated RRI sectors from NVC 304, equivalently to how EPO recovery-optimized circuitry 30 saves and recovers fully integrated RRI sectors as described above. EPO recovery-optimized circuitry 30 may then, as part of its optimized post-recovery process, in DRAM 302, finish integrating the recovered partly integrated RRI sectors, and then write the fully integrated RRI sectors to disk at the indicated addresses.

Therefore, a new data sector integrated by EPO recovery-optimized circuitry 30 may be a partly integrated data sector that comprises the received new set of data and a partial set of data from the data sector from the data sector location that comprises the indicated address for writing the new data, at the time of EPO recovery-optimized circuitry 30 detecting the loss of nominal electrical power. EPO recovery-optimized circuitry 30 may detect a loss of nominal electrical power either in the form of detecting a complete loss of power, or detecting a loss of nominal conditions of the power, such as detecting that the electrical power has gone outside of nominal values of wattage, current, or voltage, in various examples. EPO recovery-optimized circuitry 30 may be further configured to write, in response to detecting the loss of nominal electrical power, the partly integrated data sector from a memory component such as DRAM 302 to NVC 304. EPO recovery-optimized circuitry 30 may be configured to subsequently detect a restoration of nominal power, and in response to the restoration of nominal power, read and integrate the remaining portion of the data sector from disk with the saved and re-loaded partly integrated data sector into a complete new data sector, and write the complete new data sector to the selected disk surface at the data sector location that comprises the indicated address. The data sector location may be understood to comprise an indicated address for where to write new data on disk in that the indicated address is uniquely encoded in a certain servo pattern at a certain logical location on disk surface 317, and is indexed in an LBA servo navigation data store comprised in control circuitry 22, such that control circuitry 22 may use its LBA index to navigate to the unique logical location on the disk surfaces 17 comprised in disk drive 15 that comprises that indexed and encoded LBA, in various illustrative examples.

Figure 5G:
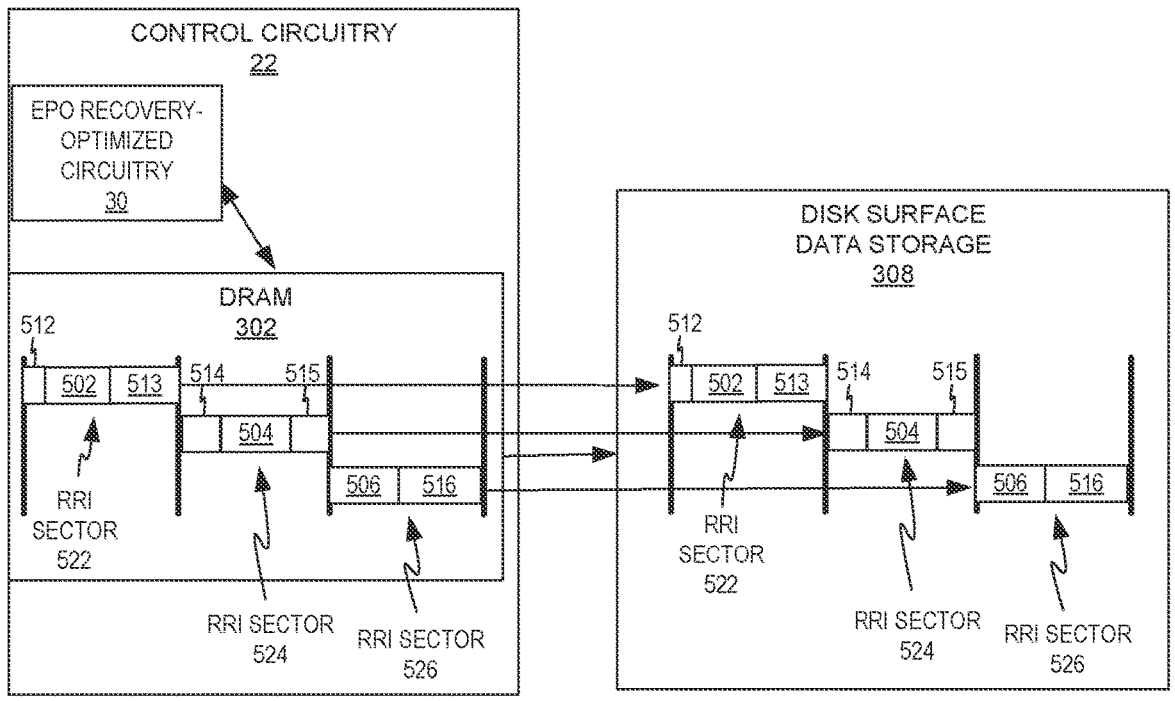
FIG. 5G illustrates a conceptual view of EPO recovery-optimized circuitry subsequently reading all three RRI sectors of this example from DRAM and writing RRI sectors to disk, to disk surface data storage on disk surfaces, in accordance with aspects of the present disclosure.

FIG. 5G illustrates a conceptual view of EPO recovery-optimized circuitry 30 subsequently reading all three RRI sectors 522, 524, and 526 of this example from DRAM 302 and writing RRI sectors 522, 524, and 526 to disk, to disk surface data storage 308 on disk surfaces 17, in accordance with aspects of the present disclosure. EPO recovery-optimized circuitry 30 thus completes the optimized post-EPO recovery process for the data suspended in DRAM 302 at the time when power is lost.

Figure 6:
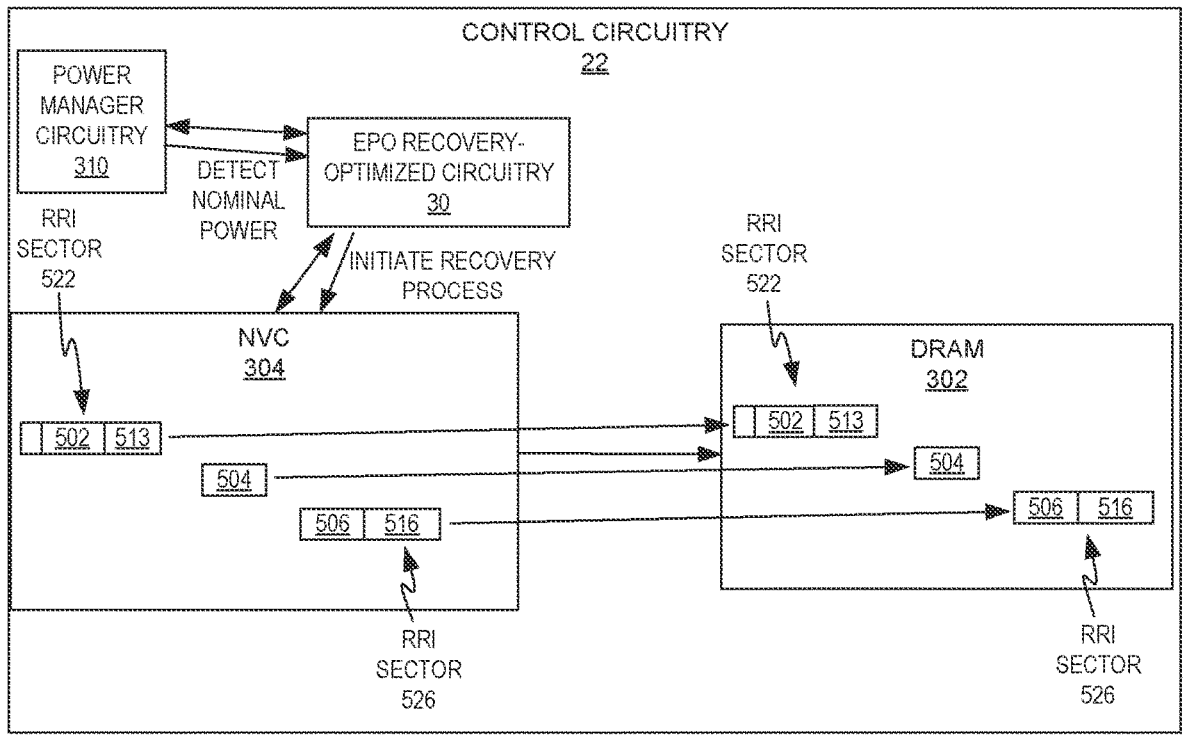
FIG. 6 illustrates a conceptual view of EPO recovery-optimized circuitry detecting, via power manager circuitry, a restoration of nominal power supply to disk drive, and in response, reading RRI sectors and an unaccompanied data block from NVC and writing RRI sectors and the unaccompanied data block directly to DRAM, in another example in accordance with aspects of the present disclosure.

FIG. 6 illustrates a conceptual view of EPO recovery-optimized circuitry 30 detecting, via power manager circuitry 310, a restoration of nominal power supply to disk drive 15, and in response, reading RRI sectors 522 and 526 and unaccompanied data block 504 from NVC 304 and writing RRI sectors 522 and 526 and unaccompanied data block 504 directly to DRAM 302, in another example, in accordance with aspects of the present disclosure. EPO recovery-optimized circuitry 30 may write data from NVC 304 directly to DRAM 302 in response to detecting a restoration of nominal power, as depicted in FIG. 6, instead of writing the data from NVC 304 to media cache 306 and then from media cache 306 to DRAM 302 as depicted in FIGS. 5D and 5E, in some examples. EPO recovery-optimized circuitry 30 may then continue with the post-EPO recovery process as described above with reference to FIGS. 5F and 5G.

Figure 7A:
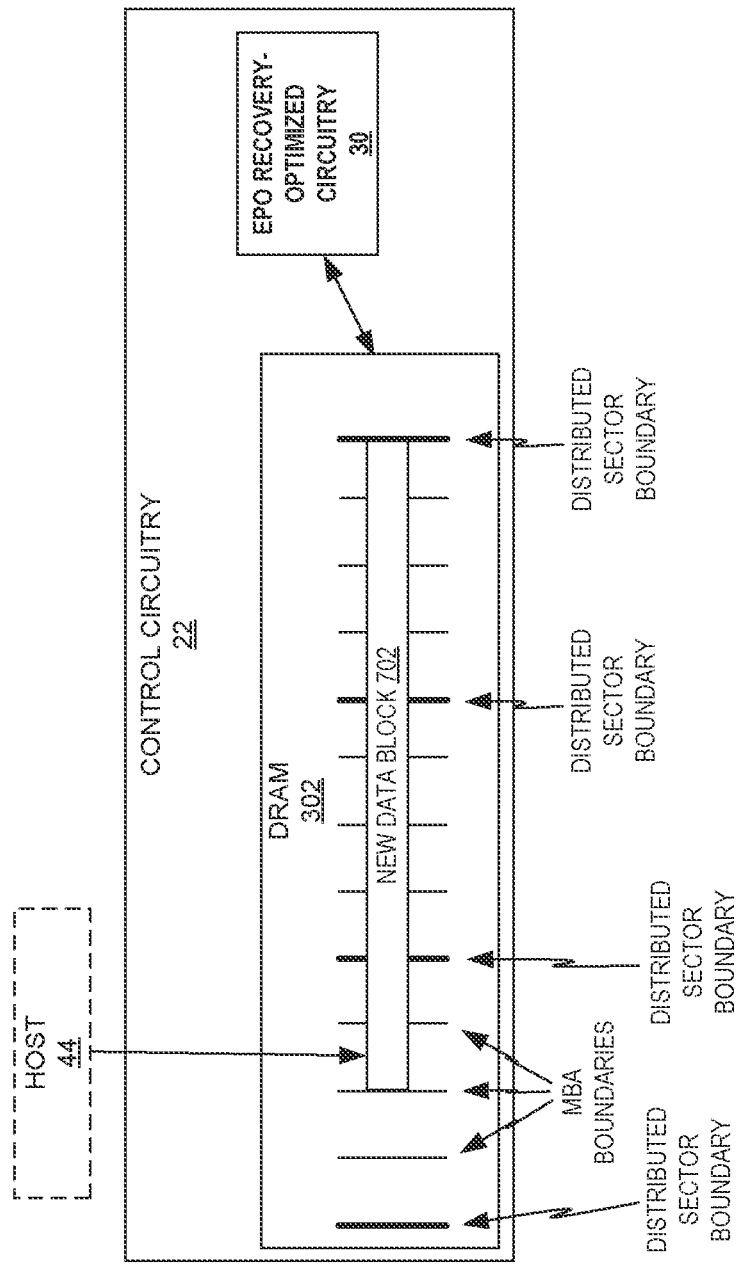
FIG. 7A depicts a conceptual view of control circuitry receiving a newly incoming data block from a host, where the newly incoming data block is several data sectors long, and control circuitry is configured to write data in a distributed sector encoding scheme, in accordance with aspects of the present disclosure.
Figure 7B:
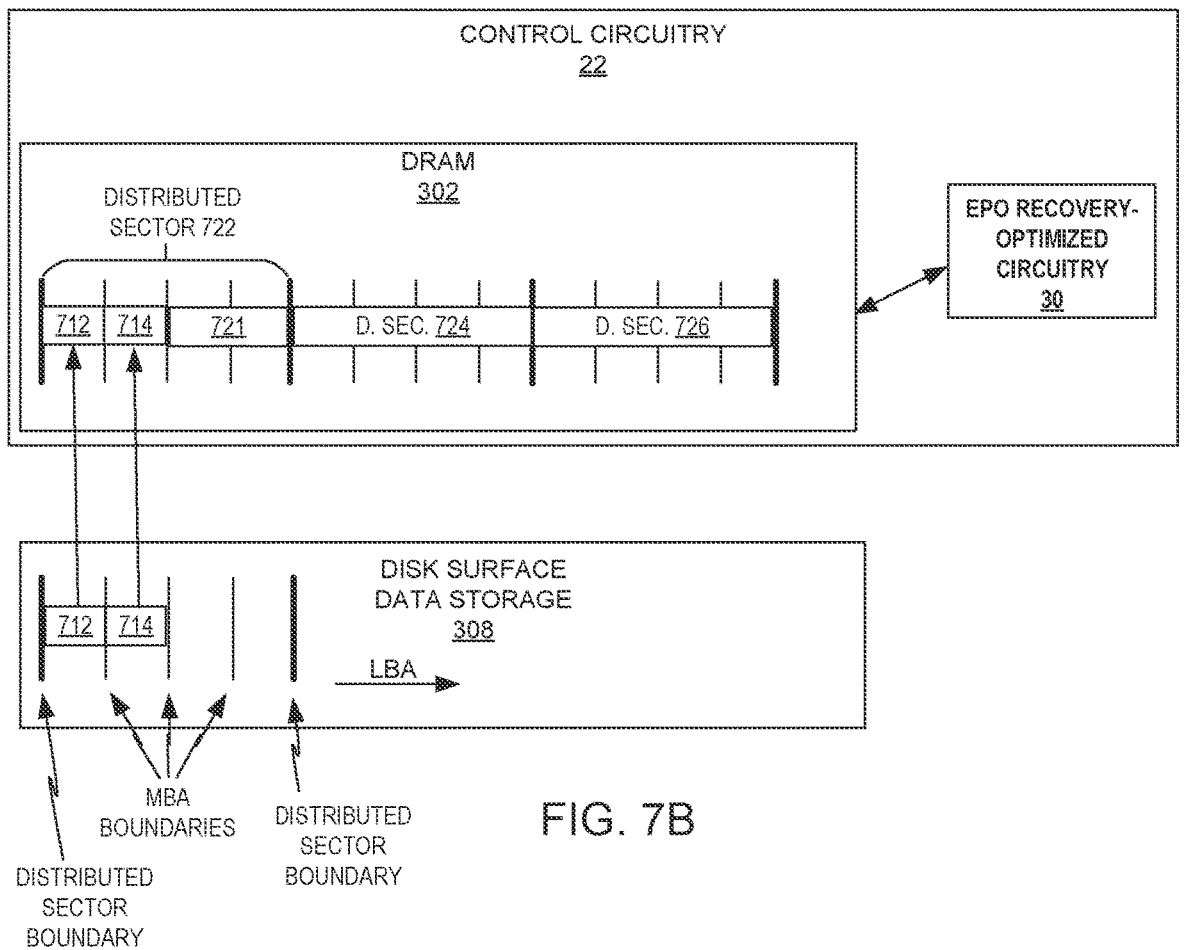
FIG. 7B depicts a conceptual view of EPO recovery-optimized circuitry reading and pre-fetching data of two data sectors from disk to DRAM, in accordance with aspects of the present disclosure.
Figure 7C:
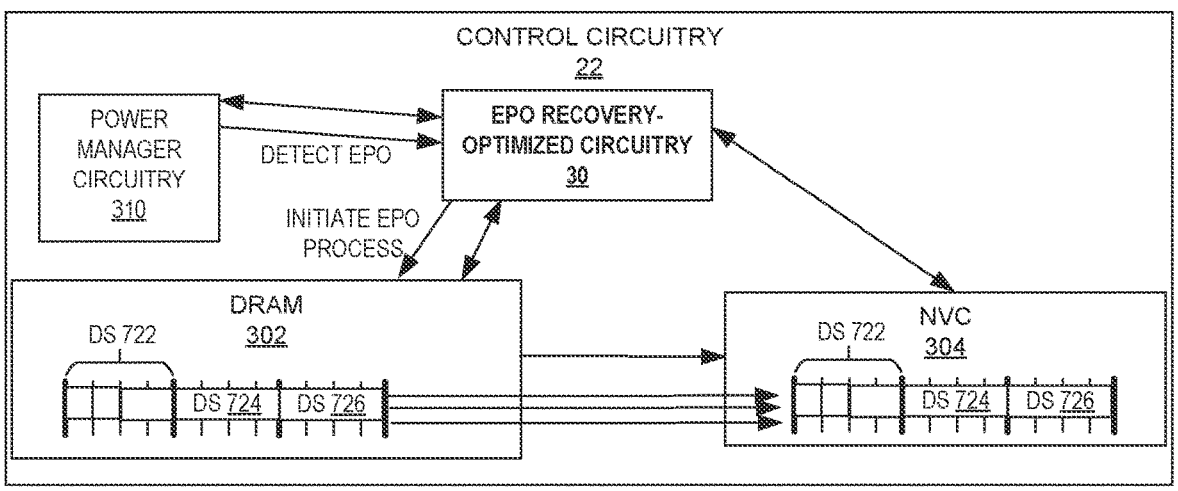
FIG. 7C illustrates a conceptual view of EPO recovery-optimized circuitry detecting, via power manager circuitry, an emergency loss of power while data block is in DRAM and not yet written to disk, and EPO recovery-optimized circuitry initiating its recovery-optimized EPO response process with a data block, in accordance with aspects of the present disclosure.

FIG. 7A depicts a conceptual view of control circuitry 22 receiving newly incoming data block 702 from host 44, where newly incoming data block 702 is several sectors long, and control circuitry 22 is configured to write data in a distributed sector encoding scheme, in accordance with aspects of the present disclosure. The methods depicted in FIGS. 7A-7C illustrate further examples of this disclosure applied in a distributed sector encoding scheme. In a distributed sector encoding scheme, control circuitry 22 may encode blocks of data in logical codewords in logical distributed sectors that span and are interleaved among multiple physical sectors. Writing in a distributed sector encoding scheme may yield advantages such as smoothing over nanoscopic defects in the media disk surfaces 17 and increasing signal-to-noise ratio (SNR) of distributed written data with the same total amount of disk area to which the data is written. In the example of FIG. 7A, control circuitry 22 receives, in DRAM 302 from host 44, data block 702 with an LBA specifying that it be written at an MBA boundary in the middle of a distributed sector. Data block 702 is depicted in DRAM 302 in a conceptual depiction of its LBA-specified location on disk.

FIG. 7B depicts a conceptual view of EPO recovery-optimized circuitry 30 reading and pre-fetching data of two data sectors 712, 714 from disk, from disk surface storage area, to DRAM 302, in accordance with aspects of the present disclosure. Data sectors 712, 714 are positioned on disk ahead of and within the same distributed sector as the LBA indicated for the newly received data block 702. EPO recovery-optimized circuitry 30 encodes, in DRAM 302, data sectors 712, 714 in integration together with a first portion of data block 702 into a first distributed sector 722 for encoding a first portion of data block 702. EPO recovery-optimized circuitry 30 encodes the further portions of data block 702 into distributed sectors 724, 726.

FIG. 7C illustrates a conceptual view of EPO recovery-optimized circuitry 30 detecting, via power manager circuitry 310, an emergency loss of power while data block is in DRAM 302 and not yet written to disk, and EPO recovery-optimized circuitry 30 initiating its recovery-optimized EPO response process with data block 702, in accordance with aspects of the present disclosure. EPO recovery-optimized circuitry 30 writes the entirety of distributed sectors 722, 724, 726, which encode data block 702, from DRAM 302 to NVC 304. This includes EPO recovery-optimized circuitry 30 writing the entirety of distributed sector 722 from DRAM 302 to NVC 304, even though half of distributed sector 722 is data already written to disk, so that distributed sector 722 will be ready to write to disk in its entirety as part of a fast, optimized post-EPO recovery process, rather than needing to perform a new post-EPO read operation of data sectors 712 and 714 to integrate together with the first portion of new data block 702. From the state depicted in FIG. 7C, EPO recovery-optimized circuitry 30 may thus perform a post-EPO recovery process and rapidly write distributed sectors 722, 724, 726 to disk, analogously to the processes depicted and described earlier.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure.

Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position heads proximate to disk surfaces among the one or more disks; and
   one or more processing devices comprising a memory component, and wherein the one or more processing devices, individually or in combination, are configured to:
   receive a set of data with an indicated address for writing the set of data to a selected disk surface among the disk surfaces;
   read, from the selected disk surface, a data sector from a data sector location that comprises the indicated address;
   integrate, in the memory component, the received set of data with a subset of the data sector read from the selected disk surface, thereby generating a new data sector that comprises the received set of data positioned in the new data sector in accordance with the indicated address;
   detect, while the new data sector is in the memory component and not yet written to the selected disk surface, a loss of nominal electrical power to the data storage device; and
   write, in response to detecting the loss of nominal electrical power, the new data sector from the memory component to a non-volatile cache.

2. The data storage device of claim 1, wherein the one or more processing devices, individually or in combination, are further configured to:
   detect a restoration of nominal power; and
   in response to detecting the restoration of nominal power, write the new data sector to the selected disk surface at the data sector location that comprises the indicated address.

3. The data storage device of claim 2, wherein the one or more processing devices, individually or in combination, are further configured to:
   in response to detecting the restoration of nominal power, write the new data sector from the non-volatile cache to a media cache; and
   load the new data sector from the media cache to the memory component,
   wherein writing the new data sector to the selected disk surface at the data sector location that comprises the indicated address comprises writing the new data sector from the memory component.

4. The data storage device of claim 2, wherein the one or more processing devices, individually or in combination, are further configured to:
   in response to detecting the restoration of nominal power, load the new data sector from the non-volatile cache to the memory component,
   wherein writing the new data sector to the selected disk surface at the data sector location that comprises the indicated address comprises writing the new data sector from the memory component.

5. The data storage device of claim 1, wherein the received set of data is a first received set of data, and wherein the one or more processing devices, individually or in combination, are further configured to:
   write, in response to detecting the loss of nominal electrical power while a second received set of data is loaded in the memory component and is not integrated in a new data sector, the second received set of data from the memory component to the non-volatile cache.

6. The data storage device of claim 5, wherein the new data sector is a first new data sector and the indicated address is a first indicated address, and wherein the one or more processing devices, individually or in combination, are further configured to:
   detect a restoration of nominal power;
   read, in response to detecting the restoration of nominal power, from the selected disk surface, a second data sector from a data sector location that comprises a second indicated address for writing the second set of data to one of the disk surfaces;
   integrate, in the memory component, the second received set of data with a subset of the second data sector read from the selected disk surface, thereby generating a second new data sector that comprises the second received set of data positioned in the second new data sector in accordance with the second indicated address; and
   write the first new data sector to the selected disk surface at the data sector location that comprises the first indicated address, and write the second new data sector to the selected disk surface at the data sector location that comprises the second indicated address.

7. The data storage device of claim 1, wherein the one or more processing devices, individually or in combination, are further configured to encode data in a distributed sector encoding scheme, and are further configured such that:
   reading the data sector from the data sector location that comprises the indicated address comprises reading one or more distributed sectors from the data sector location that comprises the indicated address;

generating the new data sector that comprises the received set of data positioned in the new data sector in accordance with the indicated address comprises generating one or more new distributed sectors that comprise the received set of data positioned in the new distributed sectors in accordance with the indicated address; and writing, in response to detecting the loss of nominal electrical power, the new data sector from the memory component to the non-volatile cache, comprises writing the new distributed sectors from the memory component to the non-volatile cache.

8. The data storage device of claim 7, wherein the one or more processing devices, individually or in combination, are further configured to:

detect a restoration of nominal power; and write, in response to detecting the restoration of nominal power, the new distributed sectors to the selected disk surface at the data sector location that comprises the indicated address.

9. The data storage device of claim 1, wherein the new data sector is a partly integrated data sector that comprises the received set of data and a partial set of data from the data sector from the data sector location that comprises the indicated address at the time of detecting the loss of nominal electrical power, and wherein the one or more processing devices, individually or in combination, are further configured to:

write, in response to detecting the loss of nominal electrical power, the partly integrated data sector from the memory component to the non-volatile cache;

detect a restoration of nominal power;

in response to detecting the restoration of nominal power, read and integrate a remaining portion of the data sector with the partly integrated data sector into a complete new data sector, and write the complete new data sector to the selected disk surface at the data sector location that comprises the indicated address.

10. A method comprising:

receiving, by one or more processing devices individually or in combination, a set of data with an indicated address for writing the set of data to a selected disk surface among one or more disks;

reading, by the one or more processing devices, individually or in combination, from a selected disk surface of a data storage device, a data sector from a data sector location that comprises the indicated address;

integrating, by the one or more processing devices, individually or in combination, in a memory component, the received set of data with a subset of the data sector read from the selected disk surface, thereby generating a new data sector that comprises the received set of data positioned in the new data sector in accordance with the indicated address;

detecting, by the one or more processing devices individually or in combination, while the new data sector is in the memory component and not yet written to the selected disk surface, a loss of nominal electrical power to the data storage device; and writing, by the one or more processing devices, individually or in combination, in response to detecting the loss of nominal electrical power, the new data sector from the memory component to a non-volatile cache.

11. The method of claim 10, further comprising:

detecting a restoration of nominal power; and in response to detecting the restoration of nominal power, writing the new data sector to the selected disk surface at the data sector location that comprises the indicated address.

12. The method of claim 11, further comprising:

in response to detecting the restoration of nominal power, writing the new data sector from the non-volatile cache to a media cache; and loading the new data sector from the media cache to the memory component, wherein writing the new data sector to the selected disk surface at the data sector location that comprises the indicated address comprises writing the new data sector from the memory component.

13. The method of claim 10, wherein the received set of data is a first received set of data, the method further comprising:

writing, in response to detecting the loss of nominal electrical power while a second received set of data is loaded in the memory component and is not integrated in a new data sector, the second received set of data from the memory component to the non-volatile cache.

14. The method of claim 13, wherein the new data sector is a first new data sector and the indicated address is a first indicated address, the method further comprising:

detecting a restoration of nominal power;

reading, in response to detecting the restoration of nominal power, from the selected disk surface, a second data sector from a data sector location that comprises a second indicated address for writing the second set of data to one of the disk surfaces;

integrating, in the memory component, the second received set of data with a subset of the second data sector read from the selected disk surface, thereby generating a second new data sector that comprises the second received set of data positioned in the second new data sector in accordance with the second indicated address;

writing the first new data sector to the selected disk surface at the data sector location that comprises the first indicated address; and writing the second new data sector to the selected disk surface at the data sector location that comprises the second indicated address.

15. The method of claim 10, wherein the one or more processing devices, individually or in combination, are configured to encode data in a distributed sector encoding scheme;

the reading the data sector from the data sector location that comprises the indicated address comprises reading one or more distributed sectors from the data sector location that comprises the indicated address;

the generating the new data sector that comprises the received set of data positioned in the new data sector in accordance with the indicated address comprises generating one or more new distributed sectors that comprise the received set of data positioned in the new distributed sectors in accordance with the indicated address;

the writing, in response to detecting the loss of nominal electrical power, the new data sector from the memory component to the non-volatile cache, comprises writing the new distributed sectors from the memory component to the non-volatile cache; and the method further comprises:

detecting a restoration of nominal power; and writing, in response to detecting the restoration of nominal power, the new distributed sectors to the selected disk surface at the data sector location that comprises the indicated address.

16. One or more processing devices, individually or in combination, comprising:

means for receiving a set of data with an indicated address for writing the set of data to a selected disk surface among one or more disks of a data storage device;

means for reading, from the selected disk surface, a data sector from a data sector location that comprises the indicated address;

means for integrating, in a memory component, the received set of data with a subset of the data sector read from the selected disk surface, thereby generating a new data sector that comprises the received set of data positioned in the new data sector in accordance with the indicated address;

means for detecting, while the new data sector is in the memory component and not yet written to the selected disk surface, a loss of nominal electrical power to the data storage device; and means for writing, in response to detecting the loss of nominal electrical power, the new data sector from the memory component to a non-volatile cache.

17. The one or more processing devices of claim 16, individually or in combination, further comprising:

means for detecting a restoration of nominal power;

means for writing, in response to detecting the restoration of nominal power, the new data sector to the selected disk surface at the data sector location that comprises the indicated address;

means for writing, in response to detecting the restoration of nominal power, the new data sector from the non-volatile cache to a media cache; and means for loading the new data sector from the media cache to the memory component, wherein the means for writing the new data sector to the selected disk surface at the data sector location that comprises the indicated address comprises means for writing the new data sector from the memory component.

18. The one or more processing devices of claim 16, individually or in combination, wherein the received set of data is a first received set of data, the one or more processing devices, individually or in combination, further comprising:

means for writing, in response to detecting the loss of nominal electrical power while a second received set of data is loaded in the memory component and is not integrated in a new data sector, the second received set of data from the memory component to the non-volatile cache.

19. The one or more processing devices of claim 18, wherein the new data sector is a first new data sector and the indicated address is a first indicated address, the one or more processing devices, individually or in combination, further comprising:

means for detecting a restoration of nominal power;

means for reading, in response to detecting the restoration of nominal power, from the selected disk surface, a second data sector from a data sector location that comprises a second indicated address for writing the second set of data to one of the disk surfaces;

means for integrating, in the memory component, the second received set of data with a subset of the second data sector read from the selected disk surface, thereby generating a second new data sector that comprises the second received set of data positioned in the second new data sector in accordance with the second indicated address; and means for writing the first new data sector to the selected disk surface at the data sector location that comprises the first indicated address; and means for writing the second new data sector to the selected disk surface at the data sector location that comprises the second indicated address.

20. The one or more processing devices of claim 19, wherein the one or more processing devices are configured to encode data in a distributed sector encoding scheme;

the means for reading the data sector from the data sector location that comprises the indicated address comprises reading one or more distributed sectors from the data sector location that comprises the indicated address;

the means for generating the new data sector that comprises the received set of data positioned in the new data sector in accordance with the indicated address comprises generating one or more new distributed sectors that comprise the received set of data positioned in the new distributed sectors in accordance with the indicated address;

the means for writing, in response to detecting the loss of nominal electrical power, the new data sector from the memory component to the non-volatile cache, comprises writing the new distributed sectors from the memory component to the non-volatile cache; and the one or more processing devices, individually or in combination, further comprise:

means for detecting a restoration of nominal power; and means for writing, in response to detecting the restoration of nominal power, the new distributed sectors to the selected disk surface at the data sector location that comprises the indicated address.

\* \* \* \* \*